United States Patent
Choi et al.

(10) Patent No.: US 10,448,050 B2
(45) Date of Patent: Oct. 15, 2019

(54) METHOD AND APPARATUS FOR MANAGING BUFFER FOR ENCODING AND DECODING MULTILAYER VIDEO

(71) Applicant: SAMSUNG ELECTRONICS CO., LTD., Suwon-si (KR)

(72) Inventors: Byeong-doo Choi, Suwon-si (KR); Min-woo Park, Yongin-si (KR); Jin-young Lee, Hwaseong-si (KR); Yong-jin Cho, Seoul (KR); Chan-yul Kim, Bucheon-si (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 15/096,666

(22) Filed: Apr. 12, 2016

(65) Prior Publication Data

US 2016/0227249 A1 Aug. 4, 2016

Related U.S. Application Data

(63) Continuation of application No. PCT/KR2014/009583, filed on Oct. 13, 2014.
(Continued)

(51) Int. Cl.
*H04N 19/597* (2014.01)
*H04N 19/196* (2014.01)
(Continued)

(52) U.S. Cl.
CPC ......... *H04N 19/597* (2014.11); *H04N 19/196* (2014.11); *H04N 19/30* (2014.11);
(Continued)

(58) Field of Classification Search
CPC ...... H04N 19/196; H04N 19/30; H04N 19/33; H04N 19/597; H04N 21/44004; H04N 19/70
See application file for complete search history.

(56) References Cited

U.S. PATENT DOCUMENTS

| 7,593,424 B2 | 9/2009 | Yamane et al. |
| 8,428,144 B2 | 4/2013 | Park et al. |

(Continued)

FOREIGN PATENT DOCUMENTS

| KR | 10-2005-0084770 A | 8/2005 |
| KR | 10-2008-0093427 A | 10/2008 |

OTHER PUBLICATIONS

Deshpande, "On Signaling DPB Parameters in VPS", Joint Collaborative Team on Video Coding (JCT-VC) of ITU-T SG 16 WP 3 and ISO/IEC JTC 1/SC 29/WG 11, Jul. 27-Aug. 2, 2013, 8 pages total, 14th Meeting, Sharp Labs of America Inc., Vienna, AT, Document JCTVC-N0197/JCT3V-E0080.

(Continued)

*Primary Examiner* — Robert J Hance
(74) *Attorney, Agent, or Firm* — Sughrue Mion, PLLC

(57) ABSTRACT

Provided are multilayer video encoding/decoding methods and apparatuses. A multilayer video decoding method may comprise obtaining, from a bitstream, information indicating a maximum size of a decoded picture buffer (DPB) with respect to a layer set comprising a plurality of layers; determining a size of the DPB with respect to the layer set based on the obtained information indicating the maximum size of the DPB; and storing a decoded picture of the layer set in the DPB of the determined size.

10 Claims, 32 Drawing Sheets

Related U.S. Application Data

(60) Provisional application No. 61/890,201, filed on Oct. 12, 2013.

(51) Int. Cl.
  *H04N 19/33* (2014.01)
  *H04N 21/44* (2011.01)
  *H04N 19/30* (2014.01)
  *H04N 19/423* (2014.01)
  *H04N 19/70* (2014.01)
  *H04N 19/31* (2014.01)
  *H04N 19/44* (2014.01)

(52) U.S. Cl.
  CPC .............. *H04N 19/31* (2014.11); *H04N 19/33* (2014.11); *H04N 19/423* (2014.11); *H04N 19/44* (2014.11); *H04N 19/70* (2014.11); *H04N 21/44004* (2013.01)

(56) References Cited

U.S. PATENT DOCUMENTS

| | | | |
|---|---|---|---|
| 9,819,941 B2* | 11/2017 | Ramasubramonian | ................... H04N 19/597 |
| 2013/0051478 A1 | 2/2013 | Wu et al. | |
| 2013/0114741 A1 | 5/2013 | Sullivan et al. | |
| 2014/0086336 A1* | 3/2014 | Wang | ................... H04N 19/70 375/240.26 |
| 2014/0301477 A1* | 10/2014 | Deshpande | ............ H04N 19/70 375/240.25 |
| 2015/0016545 A1* | 1/2015 | Ramasubramonian | ................... H04N 19/29 375/240.25 |
| 2015/0103884 A1* | 4/2015 | Ramasubramonian | ................... H04N 19/597 375/240.02 |
| 2016/0044324 A1* | 2/2016 | Deshpande | ............ H04N 19/70 375/240.25 |
| 2016/0261878 A1* | 9/2016 | Deshpande | ............ H04N 19/70 |

OTHER PUBLICATIONS

Written Opinion dated Jan. 14, 2015 issued by International Searching Authority in counterpart International Patent Application No. PCT/KR2014/009583 (PCT/ISA/237).

International Search Report dated Jan. 14, 2015 issued by International Searching Authority in counterpart International Patent Application No. PCT/KR2014/009583 (PCT/ISA/210).

* cited by examiner

FIG. 6B

| LAYER | layer_format | | |
|---|---|---|---|
| | resolution | Bit_depth | Color_format |
| FIRST LAYER | 640x480 | 8 | 4:2:0 |
| SECOND LAYER | 640x480 | 8 | 4:2:0 |
| THIRD LAYER | 1280x960 | 10 | 4:2:2 |
| FOURTH LAYER | 1280x960 | 10 | 4:2:2 |

FIG. 7A

| | 700 | |
|---|---|---|
| 701 — | vps_extension( ) { | Descriptor |
| | ... | |
| | vps_number_layer_sets_minus1 | u(10) |
| 702 — | for( i = 1; i <= vps_num_layer_sets_minus1; i++ ) { | |
| 703 { | for( j = vps_max_sub_layers_minus1; j >= 0; j-- ) | |
| | max_dpb_size_for_ layer_set_minus1 [ i ][ j ] | u(10) |
| | max_dpb_size_for_ rep_format_idx_present _flag[ i ][ j ] | u(1) |
| 704 — | if(max_dpb_size_for_ rep_format_idx_present _flag[ i ][ j ]) { | |
| 705 { | for( k = 0; k < vps_num_rep_formats_minus1; k++ ) | |
| | max_dpb_size_for_ rep_format_idx _minus1[ i ][ j ][ k ] | u(7) |
| | } | |
| | } | |
| | ... | |
| | } | |

FIG. 7B

| | Descriptor |
|---|---|
| dpb_size( ) { | |
|   for( i = 1; i < NumOutputLayerSets; i++ ) { | |
|     sub_layer_flag_info_present_flag[ i ] | u(1) |
|     for( j = 0; j <= MaxSubLayersInLayerSetMinus1[ i ]; j++ ) { | |
|       if( j > 0 && sub_layer_flag_info_present_flag[ i ] ) | |
|         sub_layer_dpb_info_present_flag[ i ][ j ] | u(1) |
|       if( sub_layer_dpb_info_present_flag[ i ][ j ] ) { | |
|         for( k = 0; k < NumSubDpbs[ LayerSetIdxForOutputLayerSet[ i ] ]; k++ ) | |
|           max_vps_dec_pic_buffering_minus1[ i ][ k ][ j ] | ue(v) |
|         ... | |
|       } | |
|     } | |
|   } | |
| } | |

710
711 — dpb_size( ) {
712 — for( i = 1; ... )
713 — for( j = 0; ... )
714 — sub_layer_dpb_info_present_flag
715 — if( sub_layer_dpb_info_present_flag... )
716 — max_vps_dec_pic_buffering_minus1

PARTITION TYPE (1500)

PREDICTION MODE (1510)

SIZE OF TRANSFORM UNIT (1520)

CODING UNIT (1710)

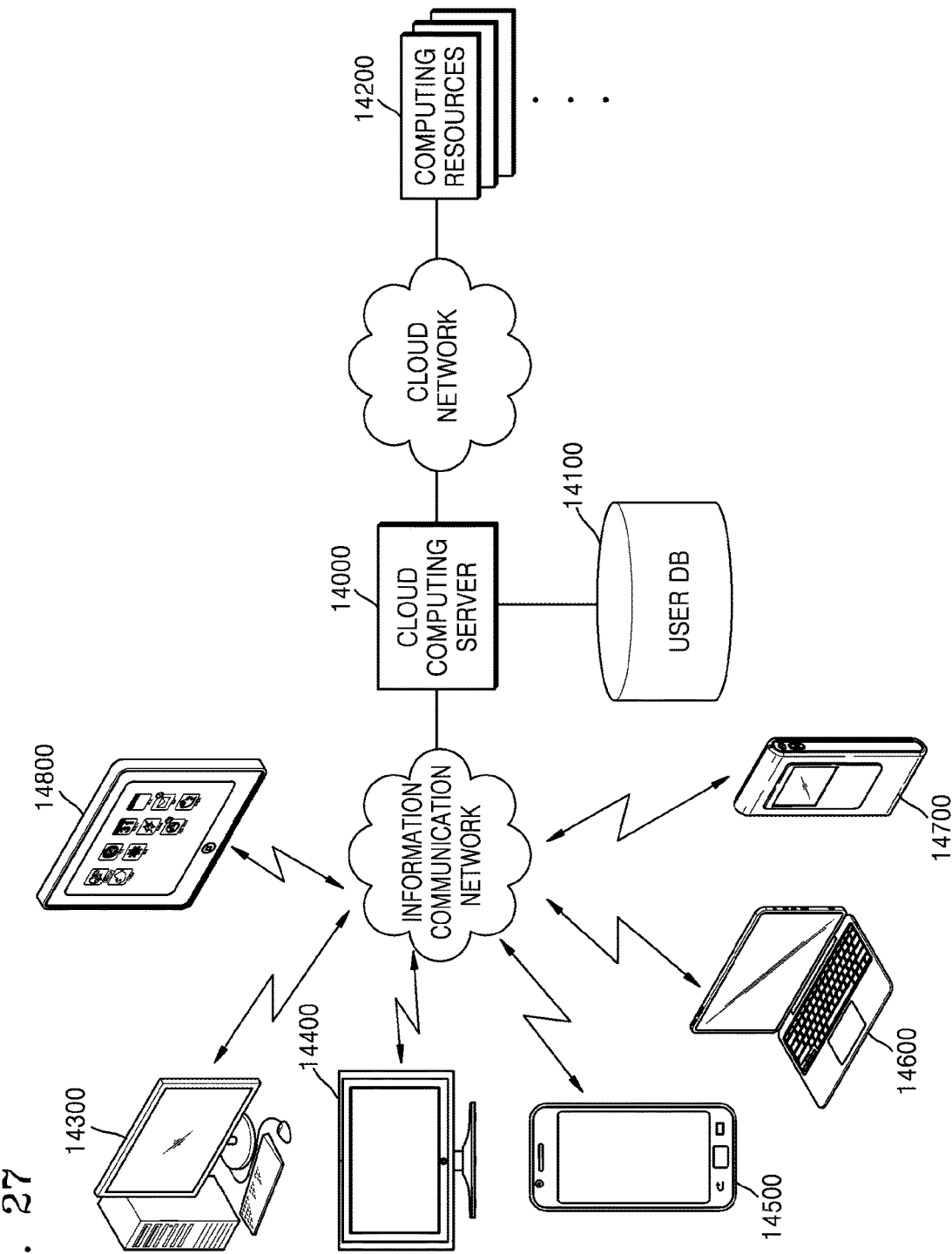

METHOD AND APPARATUS FOR MANAGING BUFFER FOR ENCODING AND DECODING MULTILAYER VIDEO

TECHNICAL FIELD

The present disclosure relates to multilayer video decoding and encoding methods, and more particularly to, buffer management methods and apparatuses for decoding and encoding of multilayer video.

BACKGROUND ART

Generally, video data is encoded according to a designated data compression standard, e.g., a moving picture expert group (MPEG) compression standard, and is stored in a data storage medium or is transmitted via a communication channel in the form of bit streams.

Multilayer video encoding (SVC) is a video compression method for suitably adjusting a data amount and transmitting data in correspondence to various types of communication networks and terminals. The SVC provides a video encoding method capable of adaptively providing a service to various transmission networks and various receiving terminals by one video stream.

Recently, multi-view encoding (MVC) for 3D video coding has been widely spread according to popularity of 3D multimedia devices and 3D multimedia contents.

In the SVC and the MVC in the related art, video is encoded according to a limited encoding method based on macro blocks of designated sizes.

DETAILED DESCRIPTION OF THE INVENTIVE CONCEPT

Technical Problem

The present disclosure provides a method of efficiently managing a decoded picture buffer (DPB) used to decode layers included in a multilayer video.

Technical Solution

The technical problems of the present disclosure are not limited to those described above. Other technical problems that are not mentioned may be clearly understood by one of ordinary skill in the art from the description below.

According to an aspect of the inventive concept, there is provided a multilayer video decoding method comprising: obtaining, from a bitstream, information indicating a maximum size of a decoded picture buffer (DPB) with respect to a layer set comprising a plurality of layers; determining a size of the DPB with respect to the layer set based on the obtained information indicating the maximum size of the DPB; and storing a decoded picture of the layer set in the DPB of the determined size.

Advantageous Effects

Encoding and decoding apparatuses according to various embodiments may have an effect of performing a video compression having further enhanced encoding rate.

Buffer management methods and apparatuses for decoding and encoding of multilayer videos according to various embodiments may signal information indicating a maximum size of a decoded picture buffer (DPB) for each multilayer set to prevent an overflow of the DPB and efficiently manage a size of the DPB.

DESCRIPTION OF THE DRAWINGS

FIG. 6B illustrates an example of determining a layer format group.

FIG. 7A illustrates an example of a syntax related to a size of a buffer for decoding a multilayer video according to various embodiments.

FIG. 7B illustrates another example of a syntax related to a size of a buffer for decoding a multilayer video according to various embodiments.

FIG. 27 is a diagram illustrating a network structure of a cloud computing system using a video encoding apparatus and a video decoding apparatus, according to various embodiments.

BEST MODE

Figure 1A:
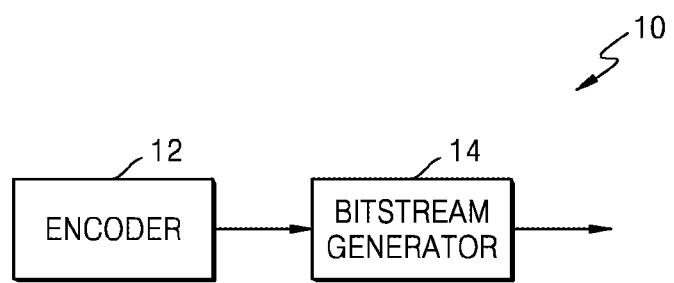
FIG. 1A is a block diagram of a configuration of a multilayer video encoding apparatus according to various embodiments.

The technical problems of the present disclosure are not limited to those described above. Other technical problems that are not mentioned may be clearly understood by one of ordinary skill in the art from the description below.

According to an aspect of the inventive concept, there is provided a multilayer video decoding method including obtaining, from a bitstream, information indicating a maximum size of a decoded picture buffer (DPB) with respect to a layer set comprising a plurality of layers; determining a size of the DPB with respect to the layer set based on the obtained information indicating the maximum size of the DPB; and storing a decoded picture of the layer set in the DPB of the determined size.

The obtaining of the information indicating the maximum size of the DPB with respect to the layer set may include: when the layer set comprises a plurality of temporal sub layers, obtaining information indicating the maximum size of the DPB for each of the plurality of temporal sub layers included in the layer set.

Information indicating the maximum size of the DPB with respect to a temporal sub layer of a first index among the plurality of temporal sub layers included in the layer set may indicate the maximum size of the DPB that is the same as or greater than the maximum size of the DPB with respect to a temporal sub layer of a second index indicating a temporal sub layer of a level lower than the first index.

The multilayer video decoding method may further include: determining whether it is possible to obtain, from the bitstream, information indicating a maximum size of a sub DPB with respect to a layer format group included in the layer set; and when it is determined that it is possible to obtain the information indicating the maximum size, obtaining the information indicating the maximum size of the sub DPB.

The multilayer video decoding method may further include: determining a size of a sub DPB with respect to the layer format group included in the layer set; and storing a decoded picture of the layer format group in the sub DPB of the determined size.

The obtaining of the information indicating the maximum size of the sub DPB may include: when the layer set comprises a plurality of temporal sub layers, obtaining information indicating the maximum size of the sub DPB with respect to the layer format group for each of the plurality of temporal sub layers included in the layer set.

The obtaining of the information indicating the maximum size of the DPB may include: from the bitstream comprising high efficiency video coding (HEVC) network abstract layer (NAL) units, obtaining the information indicating the maximum size of the DPB from a video parameter set (VPS) extension region included in a raw bytes sequence payload (RBSP) of each of the HEVC NAL units.

According to another aspect of the inventive concept, there is provided a multilayer video decoding apparatus including an obtainer for obtaining, from a bitstream, information indicating a maximum size of a decoded picture buffer (DPB) with respect to a layer set comprising a plurality of layers; the DPB for determining a size of the DPB with respect to the layer set based on the obtained information indicating the maximum size of the DPB; and a decoder for storing a decoded picture of the layer set in the DPB of the determined size.

When the layer set comprises a plurality of temporal sub layers, the obtainer may obtain information indicating the maximum size of the DPB for each of the plurality of temporal sub layers included in the layer set.

Information indicating the maximum size of the DPB with respect to a temporal sub layer of a first index among the plurality of temporal sub layers included in the layer set may indicate the maximum size of the DPB that is the same as or greater than the maximum size of the DPB with respect to a temporal sub layer of a second index indicating a temporal sub layer of a lower level than the first index.

The obtainer may determine whether it is possible to obtain, from the bitstream, information indicating a maximum size of a sub DPB with respect to a layer format group included in the layer set, and, when it is determined that it is possible to obtain the information indicating the maximum size, obtain the information indicating the maximum size of the sub DPB.

The DPB may include at least one sub DPB determined based on the information indicating the maximum size of the sub DPB, and a decoded picture of the layer format group is stored in the sub DPB of the determined size.

When the layer set comprises a plurality of temporal sub layers, the obtainer may obtain information indicating the maximum size of the sub DPB with respect to the layer format group for each of the plurality of temporal sub layers included in the layer set.

The obtainer, from the bitstream comprising HEVC NAL units, may obtain the information indicating the maximum size of the DPB from a VPS extension region included in a RBSP of each of the HEVC NAL units.

According to another aspect of the inventive concept, there is provided a multilayer video encoding method including determining a plurality of layer sets comprising at least one layer among a plurality of encoded layers; determining a maximum size of a decoded picture buffer (DPB) with respect to each of the plurality of determined layer sets; and generating information indicating the determined maximum size of the DPB with respect to each of the plurality of layer sets.

According to another aspect of the inventive concept, there is provided a multilayer video encoding apparatus including an encoder for encoding a multilayer video and generating a plurality of encoded layers; and a bitstream generator for determining a plurality of layer sets comprising at least one layer among the plurality of encoded layers, determining a maximum size of a decoded picture buffer (DPB) with respect to each of the plurality of determined layer sets, and generating information indicating the determined maximum size of the DPB with respect to each of the plurality of layer sets.

According to another aspect of the inventive concept, there is provided a non-transitory computer-readable recording medium having recorded thereon a computer program for executing the multilayer video decoding method according to various embodiments.

According to another aspect of the inventive concept, there is provided a non-transitory computer-readable recording medium having recorded thereon a computer program for executing the multilayer video encoding method according to various embodiments.

MODE OF THE INVENTIVE CONCEPT

Hereinafter, a multilayer video encoding apparatus, a multilayer video decoding apparatus, a multilayer video encoding method, and a multilayer video decoding method according to various embodiments are provided with reference to FIGS. 1A through 7B. Also, a video encoding apparatus and a video decoding apparatus, and a video encoding method and a video decoding method based on coding units of a tree structure according to various embodiments are provided with reference to FIGS. 8 through 20. Also, various embodiments of FIGS. 1A through 20 to which the multilayer video encoding method, the multilayer video decoding method, the video encoding method and the video decoding method may be applied are provided with reference to FIGS. 21 through 27. Hereinafter, an 'image' may indicate a still image of a video or a moving picture, i.e., the video itself.

First, with reference to FIGS. 1A through 7B, the multilayer video encoding apparatus, the multilayer video decoding apparatus, the multilayer video encoding method, and the multilayer video decoding method according to various embodiments are provided.

FIG. 1A is a block diagram of a configuration of a multilayer video encoding apparatus 10 according to various embodiments.

Referring to FIG. 1A, the multilayer video encoding apparatus 10 according to various embodiments includes an encoder 12, a bitstream generator 14.

The multilayer video encoding apparatus 10 according to various embodiments may classify and encode a plurality of video streams for each layer according to scalable video coding. The multilayer video encoding apparatus 10 may encode base layer images and enhancement layer images as different layers.

For example, a multi-view video may be encoded according to scalable video coding. Left view images may be encoded as base layer images. Right view images may be encoded as enhancement layer images. Alternatively, center view images, the left view images, and the right view images may be encoded, in which the center view images may be encoded as base layer images, the left view images may be encoded as first enhancement layer images, and the right view images may be encoded as second enhancement layer images. An encoding result of the base layer images may be output in a base layer stream, and an encoding result of the first enhancement layer images and the second enhancement layer images may be output in a first enhancement layer stream and a second enhancement layer stream, respectively.

In the presence of three or more enhancement layers, base layer images, first enhancement layer images, second enhancement layer images, through $K_{th}$ enhancement layer images may be encoded. Thus, an encoding result of the base layer images may be output in the base layer stream and an encoding result of the first, second, through $K_{th}$ enhancement layer images may be output in first, second, through $K_{th}$ enhancement layer streams, respectively.

The multilayer video encoding apparatus 10 according to various embodiments may perform inter prediction for predicting a current image by referring to images of a same layer. Through inter prediction, a motion vector indicating motion information between the current image and a reference image, and a residual between the current image and the reference image may be generated.

The multilayer video encoding apparatus 10 according to various embodiments may perform inter-layer prediction for predicting enhancement layer images by referring to the base layer images. The multilayer video encoding apparatus 10 may perform inter-layer prediction for predicting second enhancement layer images by referring to the first enhancement layer images. Through inter-layer prediction, a position differential component between the current image and a reference image of a different layer, and a residual between the current image and the reference image of the different layer may be generated.

When the multilayer video encoding apparatus 10 according to various embodiments allows two or more enhancement layers, the video stream encoding apparatus 10 may perform inter-layer prediction between one base layer image and two or more enhancement layer images according to a multi-layer prediction structure.

The inter-layer prediction structure will be described in more detail with reference to FIG. 3A later.

The multilayer video encoding apparatus 10 according to various embodiments encodes each video image for each respective block according to each layer. A block may have a square shape, a rectangular shape, or any geometric shape and is not limited to a data unit having a predetermined size. According to an embodiment, a block may be a largest coding unit, a coding unit, a prediction unit, a transformation unit, or the like from among coding units according to a tree structure. For example, the multilayer video encoding apparatus 10 may split and encode images according to a HEVC standard into blocks having a quadtree structure for each layer. Video encoding and decoding methods based on coding units according to a tree structure will be described below with reference to FIGS. 8 through 20. Inter prediction and inter layer prediction may be performed based on a data unit of the coding unit, the prediction unit, or the transformation unit.

The encoder 12 according to various embodiments may encode an image sequence for at least one layer. The encoder 12 may perform source coding operations including inter prediction or intra prediction for each layer to generate symbol data. For example, the encoder 12 may perform transformation and quantization on an image block recording data obtained by performing inter prediction or intra prediction on image samples, generate symbol data, perform entropy encoding on the symbol data, and generate a bitstream.

The encoder 12 may encode the image sequence for each layer. The bitstream generator 14 may generate each bitstream. As described above, the encoder 12 may encode a current layer image sequence with reference to symbol data of a different layer through inter-layer prediction. Thus, the encoder 12 according to various embodiments may refer to an image sequence of a different layer or an image sequence of a same layer according to a prediction mode to encode the image sequence of each layer. For example, the encoder 12 may predict a current sample by using peripheral samples within a current image in an intra mode, and may predict the current image by using another image of the same layer in an inter mode. The encoder 12 may predict the current image by using a reference image of the same picture order count (POC) as that of the current image from among different layer images.

Through an encoding process in the video coding layer VCL described above, the encoder 12 may output residual information regarding a coding unit, prediction mode information, and additional information regarding prediction encoding of the coding unit. The bitstream generator 14 may generate the additional information as a bitstream.

In this regard, the bitstream generator 14 may correspond to a network abstraction layer (NAL) that adds and outputs the multilayer encoding image generated by the encoder 12 and the additional information to a transmission data unit according to a predetermined format. The transmission data unit may be a NAL unit. The bitstream generator 14 may output the NAL unit by including the multilayer encoding image and the additional information in the NAL unit. The bitstream generator 14 may output the bitstream generated by the NAL unit.

The additional information may include information regarding temporal sub-layer ordering and information regarding a decoded picture buffer including information (max_dpb_size_for_layer_set+ minus1, max_dpb_size_for_rep_format_idx_minus1) indicating a maximum size of the decoded picture buffer necessary for decoding an image frame in a decoding apparatus, a reorder frame number information (num_reorder_pics) indicating the number of image frames requiring reorder, maximum delay increase information (max_latency_increase) for determining a maximum delay frame, etc. In particular, the information regarding the decoded picture buffer may be included for each layer.

Meanwhile, the decoded picture buffer may temporally store reconstruction images in order to output the reconstructions images in a display order or may temporally store reference images in inter prediction or inter layer prediction. However, since the decoded picture buffer included in the decoding apparatus has a physically limited size, the multilayer video encoding apparatus 10 may generate and transmit the information indicating the maximum size of the decoded picture buffer in order to efficiently manage the size of the decoded picture buffer. In this regard, the multilayer video encoding apparatus 10 may generate and transmit information (for example, the maximum size of the decoded picture buffer) regarding the decoded picture buffer for each temporal sub-layer and/or for each layer format group, and thus the decoding apparatus may efficiently manage the decoded picture buffer.

A method in which the multilayer video encoding apparatus 10 generates information regarding the decoded picture buffer will now be described in detail below.

The encoder 12 according to various embodiments may encode image data as a multilayer encoding image. The bitstream generator 14 according to various embodiments may generate additional information including an index indicating a layer set and may generate a bitstream including the generated index and the multilayer encoding image.

In this regard, the layer set means a group output by a multilayer video decoding apparatus and including at least one layer. For example, the multilayer video encoding apparatus 10 may decode a spatial scalable bitstrem including a plurality of layers having different resolutions. Later, a decoding apparatus may firstly decode a layer having a low resolution and may perform inter layer prediction by referring to the decoded layer, thereby decoding a layer having a higher resolution than that of the decoded layer. In this regard, since decoding apparatuses have different decoding resolution degrees, the multilayer video encoding apparatus 10 may determine, as the layer set, layers that are to be referred to so as to decode a layer having a predetermined resolution and the predetermined resolution. Thus, a plurality of layer sets including at least one layer may be determined.

As another example, when multiview scalable bitstreams encode and include layers having different views, the decoding apparatus may firstly decode a base layer indicating a left view image and may decode enhancement layers indicating a right view image and a center view image by referring to the decoded base layer. In this case, the multilayer video encoding apparatus 10 may determine and transmit layers indicating a left view, a right view, and a center view as one layer set.

The bitstream generator 14 may determine the maximum size of the decoded picture buffer with respect to each of the plurality of determined layer sets and may generate information indicating the maximum size of the decoded picture buffer with respect to each of the determined layer sets.

The bitstream generator 14 may generate information indicating the maximum size of the decoded picture buffer for each layer set and for each temporal sub-layer.

A temporal sub-layer may be a hierarchically encoded image so as to variably adjust a frame rate of a video. A hierarchy may be classified according to a temporal index Temporalid. Thus, a picture having a temporal index of 1 in a temporal hierarchy structure may be used as a reference picture having the temporal index of 1 or a temporal index of 2, 3, etc. greater than 1. However, the picture having the temporal index of 1 may not be used as a reference picture having a temporal index of 0. A temporal hierarchy structure will be described in detail with reference to FIG. 5A below.

The multilayer video encoding apparatus 10 may generate the information indicating the maximum size of the decoded picture buffer for each layer format group included in the layer set.

The layer set may include a sub group according to a predetermined condition (for example, a format group including at least one layer having the same image format). The bitstream generator 14 may determine a maximum size of a sub decoded picture buffer for each sub group and may generate information indicating the determined maximum size of the sub decoded picture buffer.

Thus, the multilayer video encoding apparatus 10 may signal information indicating the maximum size of the decoded picture buffer for each layer set, for each sub temporal layer, or for each layer format group included in each layer set such that the decoding apparatus may efficiently manage the size of the decoded picture buffer.

Meanwhile, the bitstream generator 14 may generate a VPS NAL unit including the generated index and may generate a bitstream including the VPS NAL unit. The bitstream generator 14 may generate a bitstream including the index and the multilayer encoding image generated by the encoder 12.

Figure 1B:
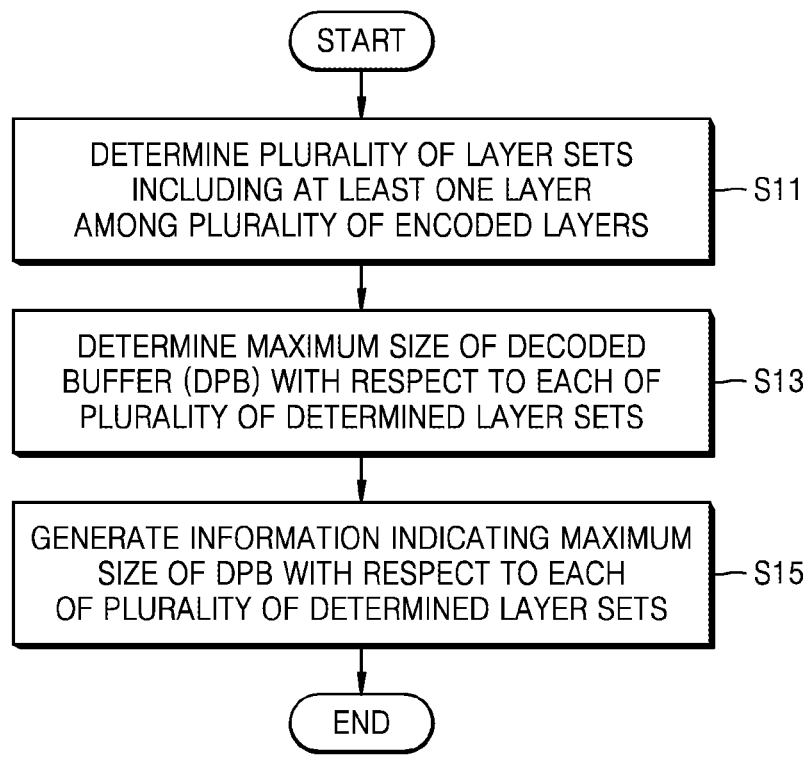
FIG. 1B is a flowchart of a multilayer video encoding method according to various embodiments.

FIG. 1B is a flowchart of a multilayer video encoding method according to various embodiments.

In operation S11, the multilayer video encoding apparatus 10 may determine a plurality of layer sets including at least one layer among a plurality of encoded layers. The multilayer video encoding apparatus 10 may determine a temporal sub-layer and a layer format group.

In operation S13, the multilayer video encoding apparatus 10 may determine a maximum size of a decoded picture buffer (DPB) with respect to each of the plurality of determined layer sets. The multilayer video encoding apparatus 10 may determine a maximum size of the DPB for each temporal sub-layer included in the layer sets and for each layer format group.

In operation S15, the multilayer video encoding apparatus 10 may generate information indicating the maximum size of the DPB with respect to each of the plurality of determined layer sets to include the information in a bitstream. The multilayer video encoding apparatus 10 may generate information indicating the maximum size of the DPB for each of the determined temporal sub-layers and for each layer format group to include the information in a bitstream.

In this regard, the information indicating the maximum size of the DPB may be included in a video parameter set (VPS) extension region among a raw bytes sequence payload (RBSP) of each of network abstract layer (NAL) units among a bitstream including high efficiency video coding (HEVC) NAL units.

Figure 2A:
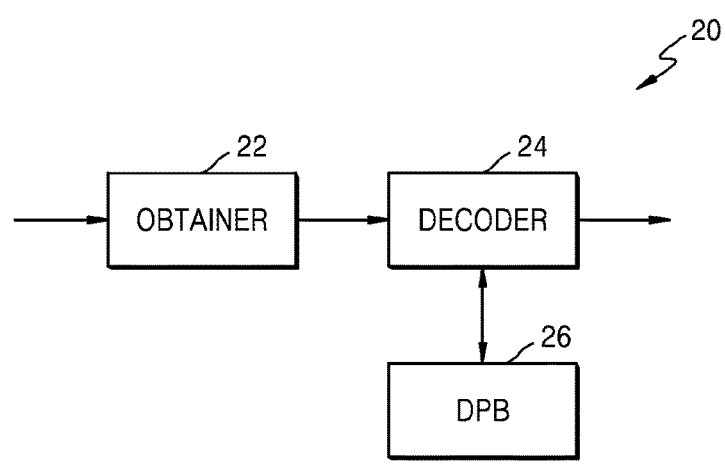
FIG. 2A is a block diagram of a configuration of a multilayer video decoding apparatus according to various embodiments.

FIG. 2A is a block diagram of a configuration of a multilayer video decoding apparatus 20 according to various embodiments.

Referring to FIG. 2A, the multilayer video decoding apparatus 20 may include an obtainer 22, a decoder 24, and a DPB 26.

The multilayer video decoding apparatus 20 according to various embodiments may receive a base layer stream and an enhancement layer stream. The multilayer video decoding apparatus 20 may receive the base layer stream recording encoding data of base layer images as a base layer stream, and the enhancement layer stream recording encoding data of enhancement layer images as an enhancement layer stream, according to scalable video coding.

The multilayer video decoding apparatus 20 may decode a plurality of layer streams according to the scalable video coding. The multilayer video decoding apparatus 20 may reconstruct base layer images by decoding the base layer stream and reconstruct enhancement layer images by decoding the enhancement layer stream.

For example, a multi-view video may be encoded according to the scalable video coding. Left-view images may be reconstructed by decoding the base layer stream, and right-view images may be reconstructed by decoding the enhancement layer stream. As another example, center-view images may be decoded by decoding the base layer stream. The left-view images may be reconstructed by further decoding a first enhancement layer stream in addition to the base layer stream. The right-view images may be reconstructed by further decoding a second enhancement layer stream in addition to the base layer stream.

The multilayer video decoding apparatus 20 may obtain encoded data of base layer images and enhancement layer images from the base layer stream and the enhancement layer stream, and may further obtain a motion vector generated through inter prediction and disparity information generated through inter layer prediction.

For example, the multilayer video decoding apparatus 20 may decode inter-predicted data for each layer and may decode inter-layer predicted data between a plurality of layers. Reconstruction may be performed through motion compensation and inter-layer decoding based on an encoding unit or a prediction unit according to various embodiments.

Images may be reconstructed by performing motion compensation for a current image with reference to reconstructed images predicted through inter-prediction of a same layer for each layer stream. Motion compensation means an operation of synthesizing a reference image determined by using a motion vector of the current image and a residual of the current image and reconfiguring a reconstruction image of the current image.

The multilayer video decoding apparatus 20 according to various embodiments may perform inter-layer decoding with reference to base layer images so as to reconstruct an enhancement layer image predicted through inter-layer prediction. Inter-layer decoding means an operation of synthesizing a reference image of a different layer determined by using the disparity information of the current image and the residual of the current image and reconfiguring the reconstruction image of the current image.

The multilayer video decoding apparatus 20 according to various embodiments may perform inter-layer decoding for reconstructing the second enhancement layer images predicted with reference to the enhancement layer images.

The multilayer video decoding apparatus 20 decodes each image of a video for each block. A block according to various embodiments may include a largest encoding unit, an encoding unit, a prediction unit, a transformation unit, etc. among encoding units according to a tree structure. For example, the multilayer video decoding apparatus 20 may decode each layer stream based on blocks of a quadtree structure determined according to a HEVC standard method to reconstruct image sequences.

The decoder 24 may obtain symbol data reconstructed through entropy decoding for each layer. The decoder 24 may perform inverse quantization and inverse transformation by using the symbol data to reconstruct quantized transformation coefficients of the residual. The decoder 24 according to another embodiment may receive a bitstream of the quantized transformation coefficients. A residual of the images may be reconstructed as a result of performing inverse quantization and inverse transformation on the quantized transformation coefficients.

The decoder 24 according to various embodiments may reconstruct an image sequence for each layer by decoding a bitstream received for each layer.

The decoder 24 may generate reconstruction images of the image sequence of each layer through inter-layer prediction between different layer images and through motion compensation between same layer images.

Therefore, the decoder 24 according to various embodiments may decode the image sequence of each layer with reference to an image sequence of a same layer or an image sequence of a different layer according to a prediction mode. For example, in an intra prediction mode, a current block may be reconstructed by using adjacent samples in a same image, and, in an inter prediction mode, the current block may be reconstructed with reference to a different image of a same layer.

Meanwhile, the obtainer 22 according to various embodiments may obtain information indicating a maximum size of a decoded picture buffer (DPB) with respect to a layer set including a plurality of layers from a bitstream.

When the layer set includes a plurality of temporal sub-layers, the obtainer 22 may obtain the information indicating the maximum size of the DPB for each temporal sub-layer included in the layer set.

The DPB 26 with respect to the layer set may include at least one sub DPB (not shown) each corresponding to a layer format group included in the layer set. In this regard, the obtainer 22 may determine whether it is possible to obtain information indicating a maximum size of the sub DPB with respect to the layer format group included in the layer set and, when it is possible to obtain the information indicating the maximum size of the sub DPB, may further obtain the information indicating the maximum size of the sub DPB with respect to the layer format group from the bitstream. For example, the obtainer 22 may obtain a flag indicating whether it is possible to obtain the information indicating the maximum size of the sub DPB and may further obtain the information indicating the maximum size of the sub DPB from the bitstream according to a flag value.

The obtainer 22 may receive an encoded bitstream including high efficiency video coding (HEVC) network abstract layer (NAL) units and may obtain a video parameter set (VPS), a sequence parameter set (SPS), a picture parameter set (PPS), a slice, a SEI message, etc. from a raw bytes sequence payload (RBSP) of each NAL unit from the bitstream. In this regard, the obtainer 22 may obtain the information indicating the maximum size of the DPB from a VPS extension region among the RBSP.

The DPB 26 according to various embodiments may temporally store images reconstructed by the decoder 24 in order to output the reconstructions images in a display order or may temporally store reference images in inter prediction or inter layer prediction. However, since the DPB 26 has a physically limited size, as described above, the obtainer 22 may obtain the information indicating the maximum size of the DPB in order to efficiently manage a size of the DPB 26. The obtainer 22 may obtain information (for example, the information indicating the maximum size of the DPB regarding the DPB for each layer set, each temporal sub-layer and/or for each layer format group, thereby efficiently managing the DPB 26 when decoding a multilayer video.

Figure 2B:
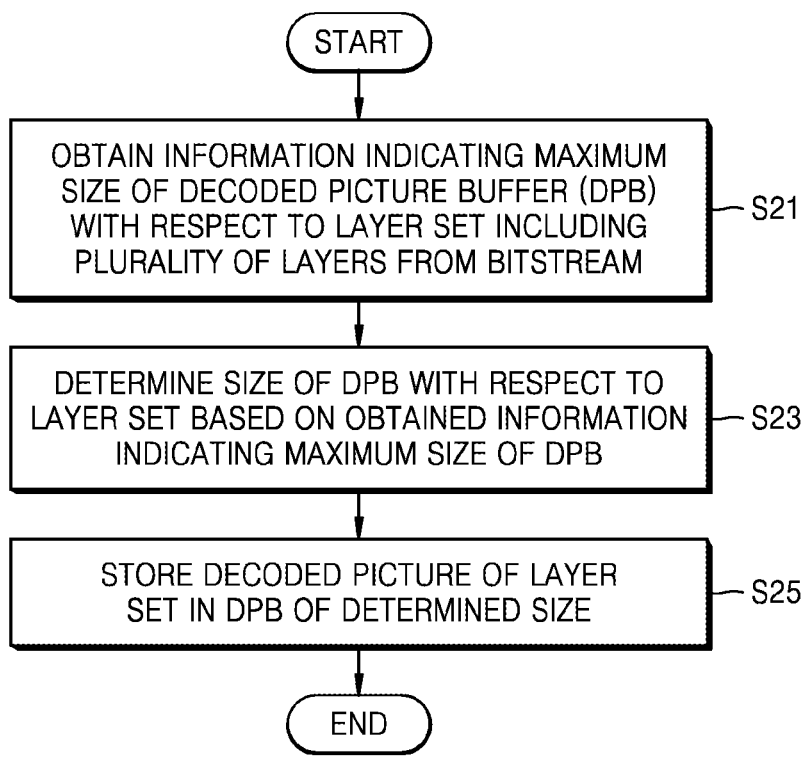
FIG. 2B is a flowchart of a multilayer video decoding method according to various embodiments.

FIG. 2B is a flowchart of a multilayer video decoding method according to various embodiments.

In operation S21, the multilayer video decoding apparatus 20 may obtain information indicating a maximum size of a decoded picture buffer (DPB) with respect to a layer set including a plurality of layers from a bitstream.

When the layer set includes a plurality of temporal sub-layers, the multilayer video decoding apparatus 20 may obtain the information indicating the maximum size of the DPB for each temporal sub-layer included in the layer set.

The information indicating the maximum size of the DPB with respect to a temporal sub layer of a first index among the temporal sub-layers included in the layer set may represent the maximum size of the DPB that is greater than or the same as the information indicating the maximum size of the DPB with respect to a temporal sub-layer of a second index indicating a temporal sub-layer of a lower level than the first index.

For example, the temporal sub-layers may be defined as a highest level value HightestTid of a hierarchical temporal index Temporalid indicating pictures that may be used for encoding or decoding of a current picture. A picture having a specific temporal index may be used as a reference picture of a picture having a temporal index that is the same as or greater than the temporal index of the picture. For example, a picture having a temporal index of 1 may be used as a reference picture of a picture having the temporal index of 1 or a temporal index of 2, 3, etc. greater than 1. However, the picture having the temporal index of 1 may not be used as a reference picture of a picture having a temporal index of 0. Thus, a temporal sub-layer having the temporal index of 2 as the highest level value may need a DPB of a size greater than a temporal sub-layer having the temporal index of 1 as the highest level value.

The multilayer video decoding apparatus 20 may determine whether it is possible to obtain information indicating a maximum size of a sub DPB with respect to a layer format group included in the layer set, and, when it is possible to obtain the information indicating the maximum size of the sub DPB, may further obtain the information indicating the maximum size of the sub DPB with respect to the layer format group.

In operation S23, the multilayer video decoding apparatus 20 may determine the size of the DPB with respect to the layer set based on the obtained information indicating the maximum size of the DPB. The multilayer video decoding apparatus 20 may determine the size of the DPB with respect to the layer set for each temporal sub-layer. The multilayer video decoding apparatus 20 may determine the maximum size of the sub DPB for each layer format group included in the layer set. Furthermore, the multilayer video decoding apparatus 20 may determine the maximum size of the sub DPB for each temporal sub-layer with respect to the layer format group included in the layer set.

In operation S25, the multilayer video decoding apparatus 20 may store a decoded picture of the layer set in the DPB of the determined size. The multilayer video decoding apparatus 20 may store a decoded picture of the layer format group in the sub DPB.

Figure 3A:
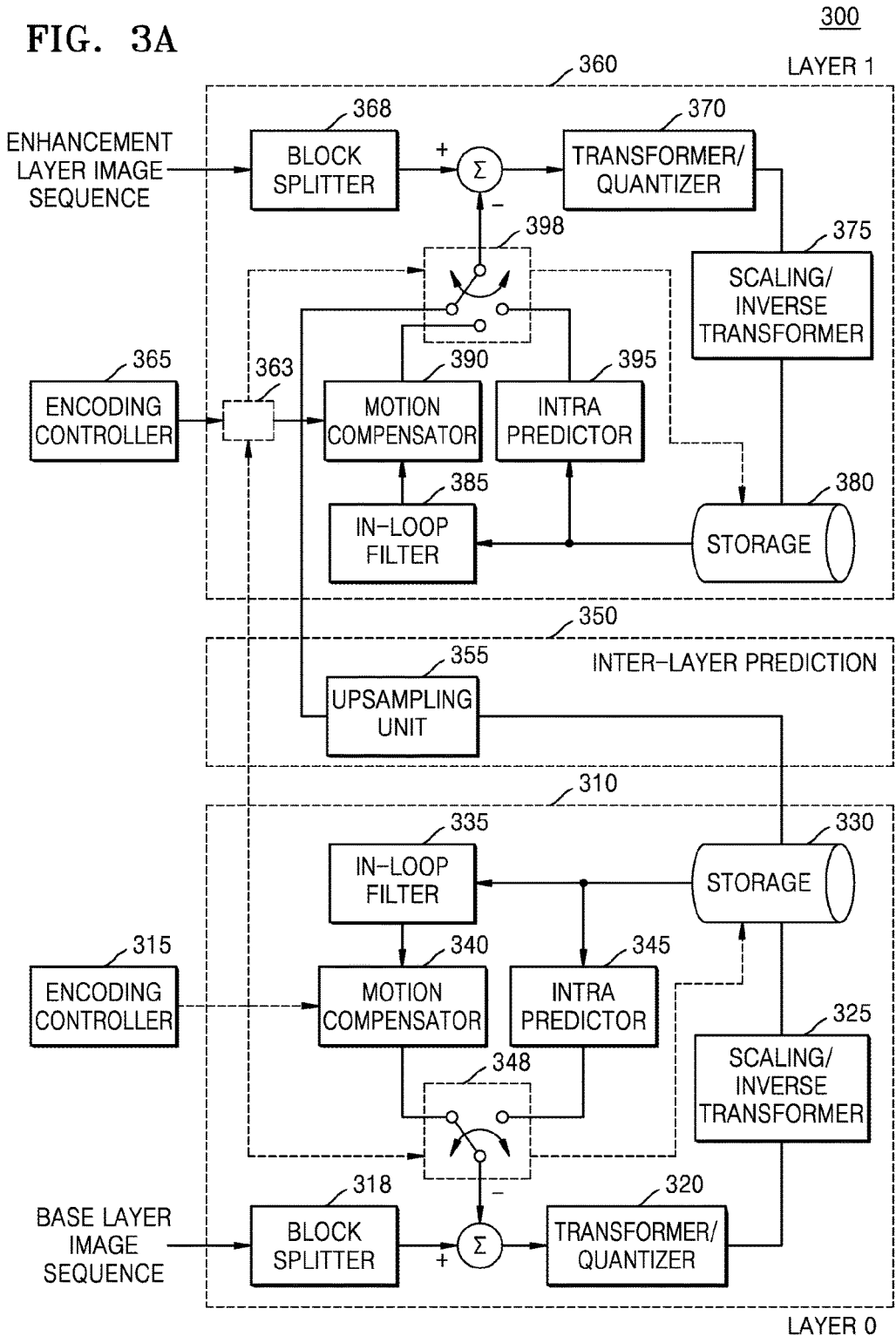
FIG. 3A illustrates an interlayer prediction structure according to various embodiments.

FIG. 3A illustrates an interlayer prediction structure according to various embodiments.

An interlayer encoding system 300 includes a base layer encoding end 310, an enhancement layer encoding end 360, and an inter layer prediction end 350 between the base layer encoding end 310 and the enhancement layer encoding end 360. The base layer encoding end 310 and the enhancement layer encoding end 360 may be included in an encoder (12 of FIG. 1).

The base layer encoding end 310 receives and encodes a base layer image sequence for each image. The enhancement layer encoding end 360 receives and encodes an enhancement layer image sequence for each image. Redundant descriptions of similar operations between the base layer encoding end 310 and the enhancement layer encoding end 360 will be simultaneously given.

Block splitters 318 and 368 split input images (a low resolution image and a high resolution image) into a largest coding unit, an encoding unit, a prediction unit, a transformation unit, etc. To encode the encoding unit output by the block splitters 318 and 368, intra prediction or inter prediction may be performed for each prediction unit of the encoding unit. Prediction switches 348 and 398 may perform inter prediction with reference to a previous reconstructed image output by motion compensators 340 and 390 or may perform intra prediction by using a neighboring prediction unit of a current prediction unit within the current input image output by intra prediction units 345 and 395 according to whether a prediction mode of the prediction unit is an intra prediction mode or an inter prediction mode. Residual information may be generated for each prediction unit through inter prediction.

Residual information between the prediction unit and an adjacent image is input into transformer/quantizers 320 and 370 for each prediction unit of the encoding unit. The transformer/quantizers 320 and 370 may perform transformation and quantization for each transformation unit based on the transformation unit of the encoding unit and may output a quantized transformation coefficient.

Scaler/inverse transformer 325 and 375 may perform scaling and inverse transformation on the quantized transformation coefficient for each transformation unit of the encoding unit again to generate residual information of a spatial area. When an inter mode is configured by the prediction switches 348 and 398, the residual information is combined with the previous reconstruction image or the neighboring prediction unit, thereby generating a reconstruction image including a current prediction unit, and storing a current reconstruction image in storages 330 and 380. The current reconstruction image may be transferred to intra prediction units 345 and 395/motion compensation units 340 and 390 according to a prediction mode of a prediction unit encoded later.

In particular, in the inter mode, in-loop filtering units 335 and 385 may perform at least one selected from deblocking filtering and sample adaptive offset (SAO) filtering for each encoding unit on the reconstruction image stored in the storages 330 and 380.

Deblocking filtering is filtering for relaxing a blocking phenomenon of the data unit. SAO filtering is filtering for compensating for a pixel value modified by data encoding and decoding. Data filtered by the in-loop filtering units 335 and 385 may be transferred to the motion compensation units 340 and 390 for each prediction unit. Residual information between the current reconstruction image output by the motion compensation units 340 and 390 and the block splitters 318 and 368 and a next encoding unit may be generated, to encode an encoding unit of a next order output by the block splitters 318 and 368 again.

In this way, the above-described encoding method may be repeated for each encoding unit of the input image.

The enhancement layer encoding end 360 for inter layer prediction may refer to the reconstruction image stored in the storage 330 of the base layer encoding end 310. An encoding controller 315 of the base layer encoding end 310 may control the storage 330 of the base layer encoding end 310 and may transfer the reconstruction image of the base layer encoding end 310 to the enhancement layer decoding end 360. The inter layer prediction end 350 may perform deblocking filtering or SAO filtering on the base layer reconstruction image output by the storage 310 of the base layer encoding end 310. When a resolution differs between images of the base layer and that of the enhancement layer, the inter layer prediction end 350 may upsample the reconstruction image of the base layer and may transfer the reconstruction image to the enhancement layer encoding end 360. When inter layer prediction is performed according to control of the switch 398 of the enhancement layer encoding end 360, inter layer prediction may be performed on the enhancement layer image with reference to the base layer reconstruction image transferred through the inter layer prediction end 350.

For encoding of an image, various encoding modes for the encoding unit, the prediction unit, and the transformation unit may be set. For example, a depth or a split flag, etc. may be set as an encoding mode with respect to the encoding unit. A prediction mode, a partition mode, intra direction information, reference list information, etc. may be set as an encoding mode with respect to the prediction unit. A transformation depth or the split flag, etc. may be set as an encoding mode with respect to the transformation unit.

The base layer encoding end 310 may determine an encoding depth having a highest encoding efficiency, a prediction mode, a partition mode, an intra direction/reference list, a transformation depth, etc. according to a result of performing encoding by applying various depths for the encoding unit, various prediction modes with respect to the prediction unit, various partition modes, various intra directions, various reference lists, and various transformation depths for the transformation unit, respectively. However, the present invention is not limited to the encoding modes determined by the base layer encoding end 310.

The encoding controller 315 of the base layer encoding end 310 may control various encoding modes to be appropriately applied to operations of the elements. The encoding controller 315 may control the enhancement layer encoding end 360 to determine the encoding mode or the residual information by referring to an encoding result of the base layer encoding end 310, for inter layer encoding of the enhancement layer encoding end 360.

For example, the enhancement encoding end 360 may determine an encoding mode for the enhancement layer image by using the encoding mode of the base layer encoding end 310 as an encoding mode of the enhancement layer image or by referring to the encoding mode of the base layer encoding end 310. The encoding controller 315 of the base layer encoding end 310 may control a control signal of the encoding controller 355 of the enhancement layer encoding end 360 so that the enhancement layer encoding end 360 may use a current encoding mode from the encoding mode of the base layer encoding end 310, to determine the current encoding mode.

Similarly to the inter layer encoding system 300 according to the inter layer prediction method of FIG. 3A, an inter layer decoding system according to the inter layer prediction method may be implemented. That is, the inter layer decoding system of a multi-layer video may receive a base layer bitstream and an enhancement layer bitstream. A base layer decoding end of the inter layer decoding system may decode the base layer bitstream to reconstruct base layer images. An enhancement layer decoding end of the inter layer decoding system of the multi-layer video may use a base layer reconstruction image and parsed encoding information to decode the enhancement layer bitstream and reconstruct enhancement layer images. Various embodiments in which the interlayer encoding system 300 according to interlayer prediction and an interlayer decoding system (not shown) according to interlayer prediction utilize a multilayer video will now be described in detail with reference to FIG. 3B.

Figure 3B:
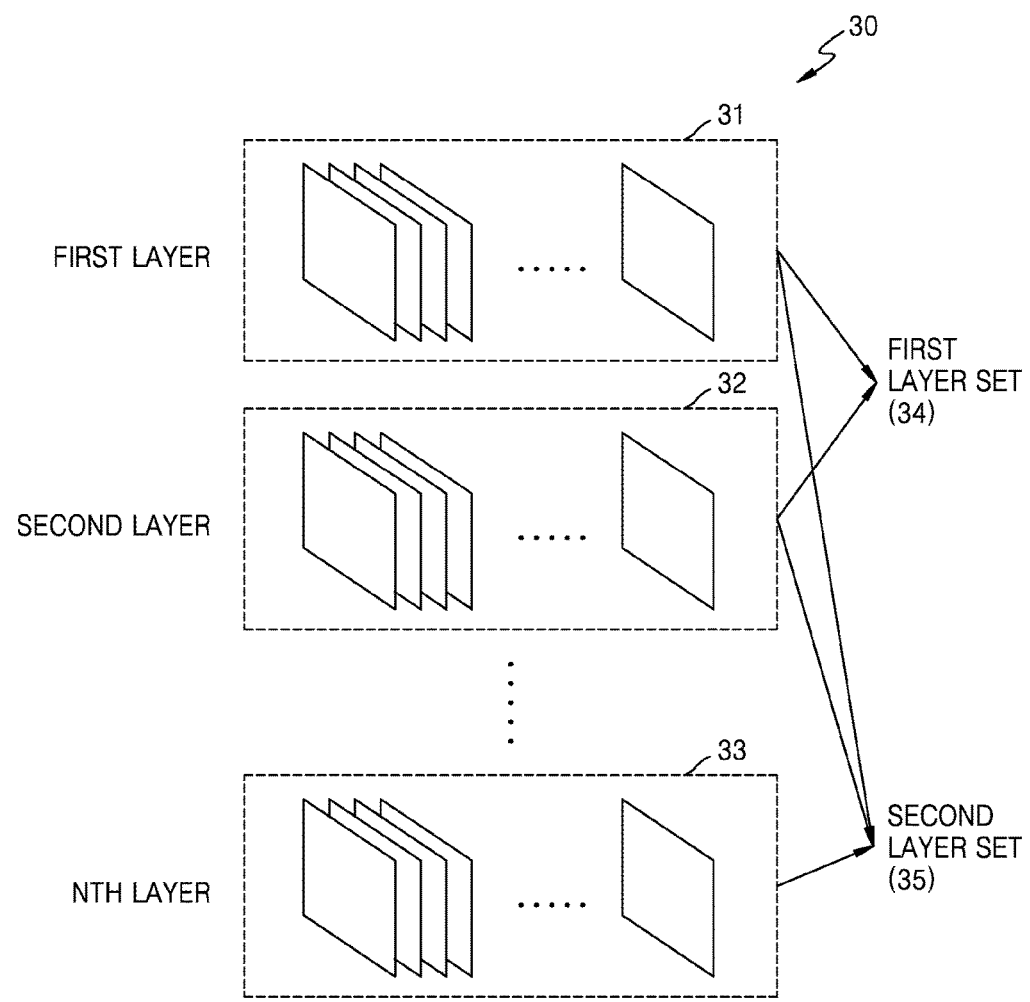
FIG. 3B is a diagram of a multilayer video according to various embodiments.

FIG. 3B is a diagram of a multilayer video according to various embodiments.

To provide an optimum service in various network environments and various terminals, the multilayer video encoding apparatus 10 may encode multilayer image sequences having various spatial resolutions, various qualities, various frame rates, and different views to output a scalable bitstream. That is, the multilayer video encoding apparatus 10 may encode an input image according to various scalability types to generate and output a scalable video bitstream. Scalability includes temporal, spatial, quality, and multiview scalabilities and a combination of these. Such scalabilities may be classified according to each type. The scalabilities may be classified according to level identifiers in each type.

For example, the scalabilities have scalability types such as temporal, spatial, quality, and multiview scalabilities. The scalabilities may be classified according to scalability level identifiers for each type. For example, different scalabilities may have different level identifiers. For example, a high scalability level may be allocated to a high level scalability with respect to the corresponding scalability type.

When a bitstream is separated into valid sub streams, the bitstream is called scalable. A spatially scalable bitstream includes sub streams of various resolutions. A scalability level is used to different scalabilities in the same scalability type. The scalability level may be represented as the scalability level identifier.

For example, the spatially scalable bitstream may be separated into sub streams having different resolutions such as OVGA, VGA, WVGA, etc. For example, each of layers having different resolutions may be classified by using a level identifier. For example, the QVGA sub stream may have 0 as a spatial scalability level identifier value, the VGA sub stream may have 1 as the spatial scalability level identifier value, and the WVGA sub stream may have 2 as a spatial scalability level identifier value.

A temporally scalable bitstream includes sub streams having various frame rates. For example, the temporally scalable bitstream may be separated into sub streams having a frame rate of 7.5 Hz, a frame rate of 15 Hz, a frame rate of 30 Hz, and a frame rate of 60 Hz. A quality scalable bitstream may be separated into sub streams having different qualities according to a coarse grained scalability (CGS) method, a medium grained scalability (MGS) method, and a fine grained scalability (FGS) method. A temporal scalability may be classified into different levels according to different frame rates. A quality scalability may be classified into different levels according to different methods.

A multiview scalable bitstream includes sub streams of different views in one bitstream. As an example, a bitstream of a stereoscopic image includes a left image and a right image. The scalable bitstream may include a multiview image and sub streams regarding encoded data of a depth map. A view scalability may be classified into different levels according to each view.

Different scalable extension types may be combined with each other. That is, the scalable video stream may include sub streams obtained by encoding image sequences of a multilayer in which at least one of temporal, spatial, quality, and multiview scalabilities includes different images.

FIG. 3B illustrates image sequences 31, 32, and 33 having different scalable extension types. An image sequence 31 of a first layer, an image sequence 32 of a second layer, and an image sequence 33 of an nth (n is an integral) layer may be image sequences that are different from each other in at last one of resolution, quality, and view. An image sequence of one layer among the image sequence 31 of the first layer, the image sequence 32 of the second layer, and the image sequence 33 of the nth (n is an integral) layer may be an image sequence of a base layer, and image sequence of other layers may be image sequences of an improvement layer.

As an example, the image sequence 31 of the first layer may be images of a first view, the image sequence 32 of the second layer may be images of a second view, and the image sequence 33 of the nth (n is an integral) layer may be image of an nth view. As another example, the image sequence 31 of the first layer may be a left view image of the base layer, the image sequence 32 of the second layer may be a right view image of the base layer, and the image sequence 33 of the nth (n is an integral) layer may be a right view image of the enhancement layer. The image sequences 31, 32, and 33 having different scalable extension types, but not limited to the examples described above, may be image sequences having different image attributes.

Meanwhile, image sequences of different layers are grouped as at least one layer set, thereby increasing encoding/decoding efficiency of a multilayer video.

For example, the image sequence 31 of the first layer may and the image sequence 32 of the second layer may be determined as a first layer set 34, and the image sequence 31 of the first layer may, the image sequence 32 of the second layer, and the image sequence 33 of the nth (n is an integral) layer may be determined as a second layer set 35. Thus, to reconstruct a high quality image, a decoding apparatus requiring the image sequence 33 of the nth layer may reconstruct an image from a bitstream of a layer included in the second layer set 35, and a decoding apparatus capable of reconstructing only a low quality image may reconstruct an image from a bitstream of a layer included in the first layer set 34.

Furthermore, information necessary for decoding an image frame may be obtained for each layer set, thereby efficiently reconstructing a multilayer video.

Furthermore, as will be described with reference to FIG. 6B later, layer image sequences included in layer sets may be subdivided into predetermined format groups based on resolution, a bit depth, or an image format such as a color format. Sub decoded picture buffer for each predetermined format group may be determined.

Figure 4:
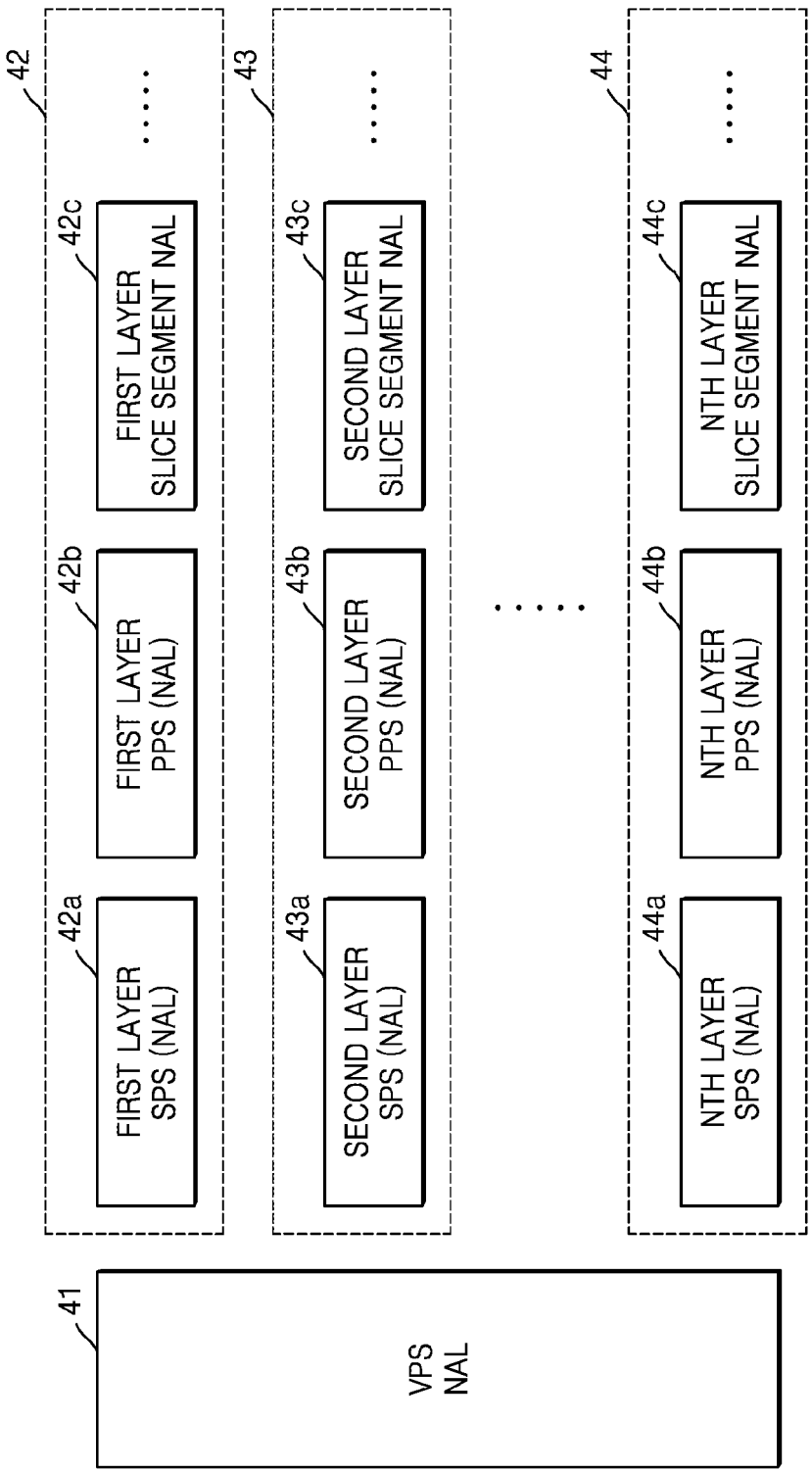
FIG. 4 illustrates NAL units including encoded data of a multilayer video according to various embodiments.

FIG. 4 illustrates NAL units including encoded data of a multilayer video according to various embodiments.

As described above, the bitstream generator 14 may output the NAL units including encoded multilayer video data and additional information.

A video parameter set (hereinafter referred to as "VPS") includes information applied to multilayer image sequences 42, 43, and 44 included in a multilayer video. A NAL unit including information regarding the VPS is referred to as a VPS NAL unit 41.

The VPS NAL unit 41 includes a common syntax element shared by the multilayer image sequences 42, 43, and 44, information regarding an operation point for blocking transmission of unnecessary information, essential information regarding the operation point required in a session negotiation step such as a profile or a level, etc. In particular, the VAP NAL unit 41 according to various embodiments includes scalability information relating to a scalability identifier for implementation of scalability in a multilayer video. The scalability information is information for determining scalability applied to the multilayer image sequences 42, 43, and 44 included in the multilayer video.

The scalability information includes information regarding a scalability type and a scalability level applied to the multilayer image sequences 42, 43, and 44 included in the multilayer video. In encoding and decoding methods according to a first embodiment of the present disclosure, the scalability information may be directly acquired from a value of a hierarchy identifier included in a NAL unit header. The hierarchy identifier is an identifier for classifying a plurality of layers included in the VPS. The VPS may signal the hierarchy identifier with respect to each layer through a VPS extension. The hierarchy identifier with respect to each layer of the VPS may be signaled by being included in the VPS NAL unit 41. For example, a hierarchy identifier of a NAL unit that belongs to the VPS may be signaled through the VPS extension. Thus, the encoding and decoding methods according to an embodiment of the present disclosure may use the VPS to obtain scalability information regarding layers of NAL units that belong to the corresponding VPS by using hierarchy identifier values of corresponding NAL units.

Figure 5A:
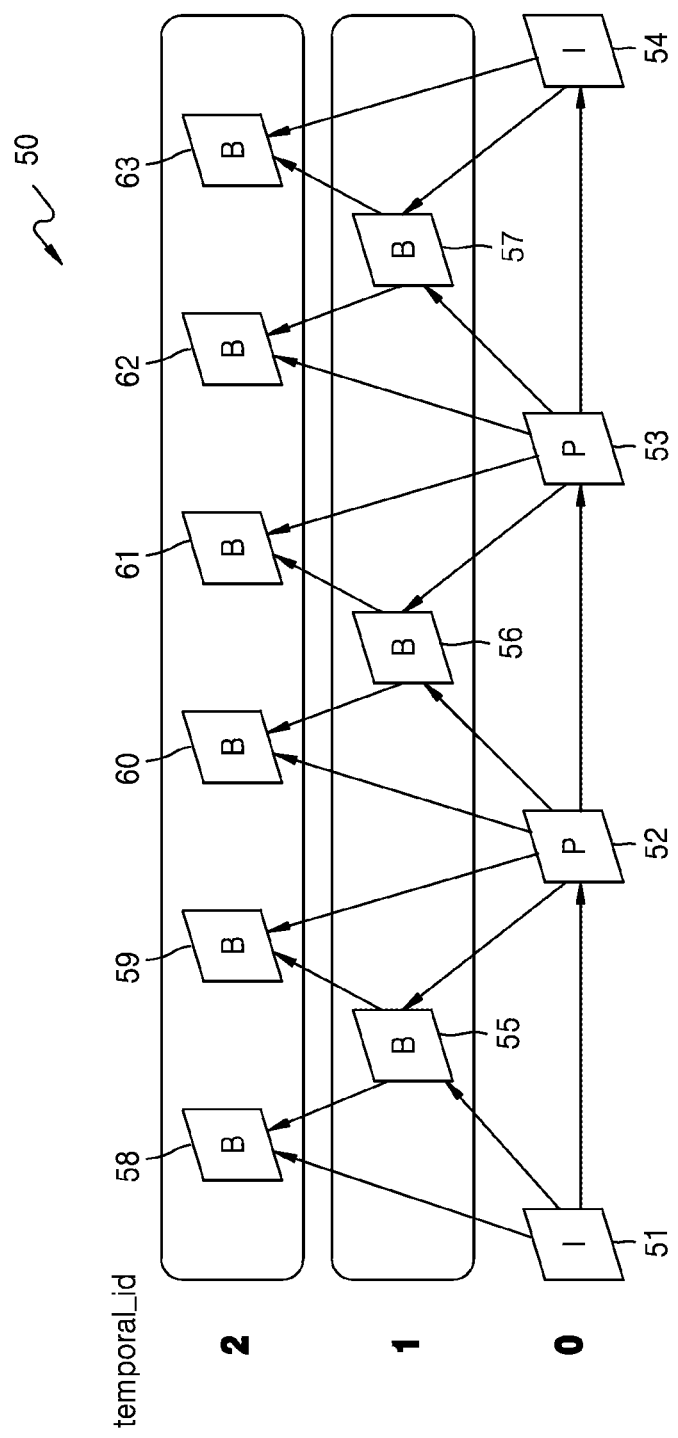
FIG. 5A illustrates a temporal sublayer prediction structure based on temporal hierarchical encoding and decoding methods according to various embodiments.

FIG. 5A illustrates a temporal sublayer prediction structure based on temporal hierarchical encoding and decoding methods according to various embodiments.

Scalable video coding may be performed according to a temporal hierarchical structure 50. The temporal hierarchical structure 50 includes a prediction structure of hierarchical B type images 55, 56, 57, 58, 59, 60, 61, and 62, and 63. In a prediction structure of a level 0, inter prediction of I type images 51 and 54 and inter prediction of P type images 52 and 53 are performed. In a prediction structure of a level 1, inter prediction of the B type images 55, 56, and 57 that refer to the I and P type images 51, 52, 53, and 54 are performed. In a prediction structure of a level 2, inter prediction that refer to the I and P type images 51, 52, 53, and 54 and the B type images 55, 56, and 57 of the level 1 are performed.

A temporal index 'temporal_id' is a number for identifying a prediction level. As each of level images is output, a frame rate may increase. For example, the images 51, 52, 53, and 54 of the level 0 may be decoded and output to a frame rate of 15 Hz, if the images 55, 56, and 57 of the level 1 are decoded and output, the frame rate may increase to 30 Hz, and if the images 58, 59, 60, 61, and 62, and 63 of the level 2 are decoded and output, the frame rate may increase to 60 Hz.

According to various embodiments, if the temporal hierarchical structure 50 is implemented according to scalable video coding, the images of the level 0 may be encoded as base layer images, the images of the level 1 may be encoded as first enhancement layer images, and the images of the level 2 may be encoded as second enhancement layer images.

Therefore, the multilayer video decoding apparatus 20 according to various embodiments may determine not only a size of a decoded picture buffer for each layer set but also the size of the decoded picture buffer based on a highest level of a temporal layer, thereby efficiently managing the size of the decoded picture buffer. For example, a largest size of the decoded picture buffer may be determined with respect to a temporal sub layer having a temporal layer of a highest level 1 and a temporal sub layer having a temporal layer of a highest level 2.

A method of determining a size of a decoded picture buffer for each temporal sub layer will now be described with reference to FIG. 5B below.

Figure 5B:
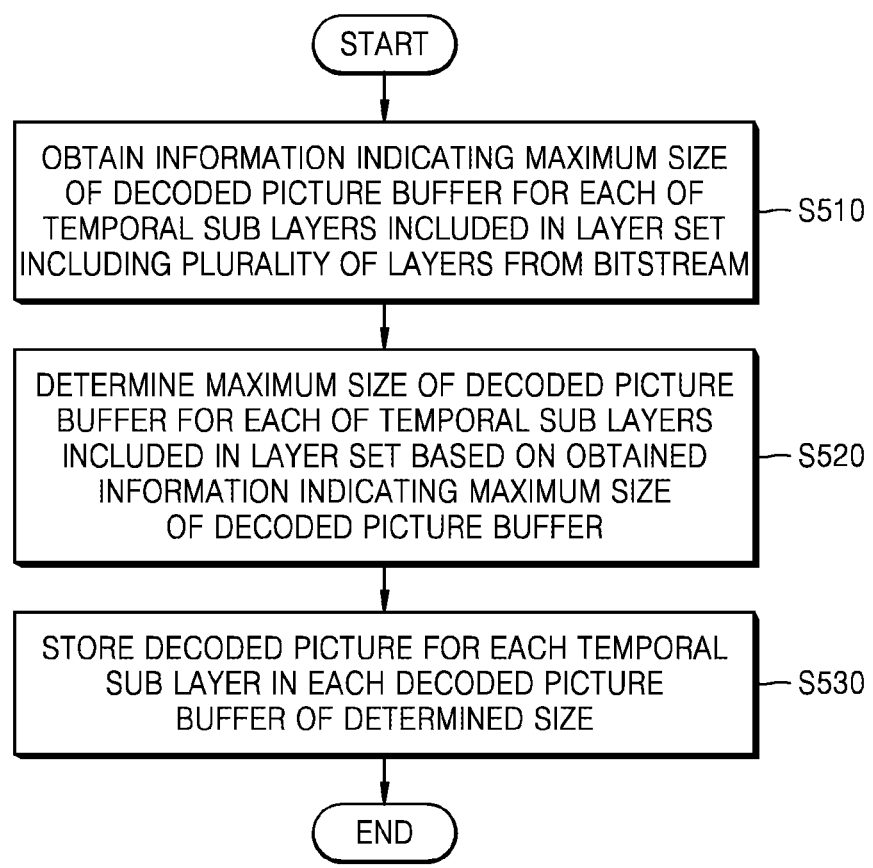
FIG. 5B is a flowchart for describing a method of managing a decoded picture buffer (DPB) for each temporal sublayer according to various embodiments.

FIG. 5B is a flowchart for describing a method of managing a decoded picture buffer for each temporal sub layer according to various embodiments.

In operation S510, the multilayer video decoding apparatus 20 may obtain information indicating a maximum size of the decoded picture buffer for each of temporal sub layers included in a layer set including a plurality of layers from a bitstream.

For example, the multilayer video decoding apparatus 20 may obtain information max_dpb_size_for_layer_set_minus1 [i][j] indicating the maximum size of the decoded picture buffer for each of the temporal sub layers included in the layer set. In this regard, j denotes an index of the layer set and j may denote a highest level value hightestTid of a temporal index Temporalid that may be used in a temporal sub layer. Thus, information indicating the maximum size of the decoded picture buffer in which a j value is 2 may indicate the maximum size of the decoded picture buffer that is the same as or greater than information indicating the maximum size of the decoded picture buffer in which the j value is 1.

In operation S520, the multilayer video decoding apparatus 20 may determine the maximum size of the decoded picture buffer for each of the temporal sub layers included in the layer set based on the obtained information indicating the maximum size of the decoded picture buffer.

In operation S530, the multilayer video decoding apparatus 20 may store a decoded picture for each temporal sub layer in each decoded picture buffer of the determined size.

Figure 6A:
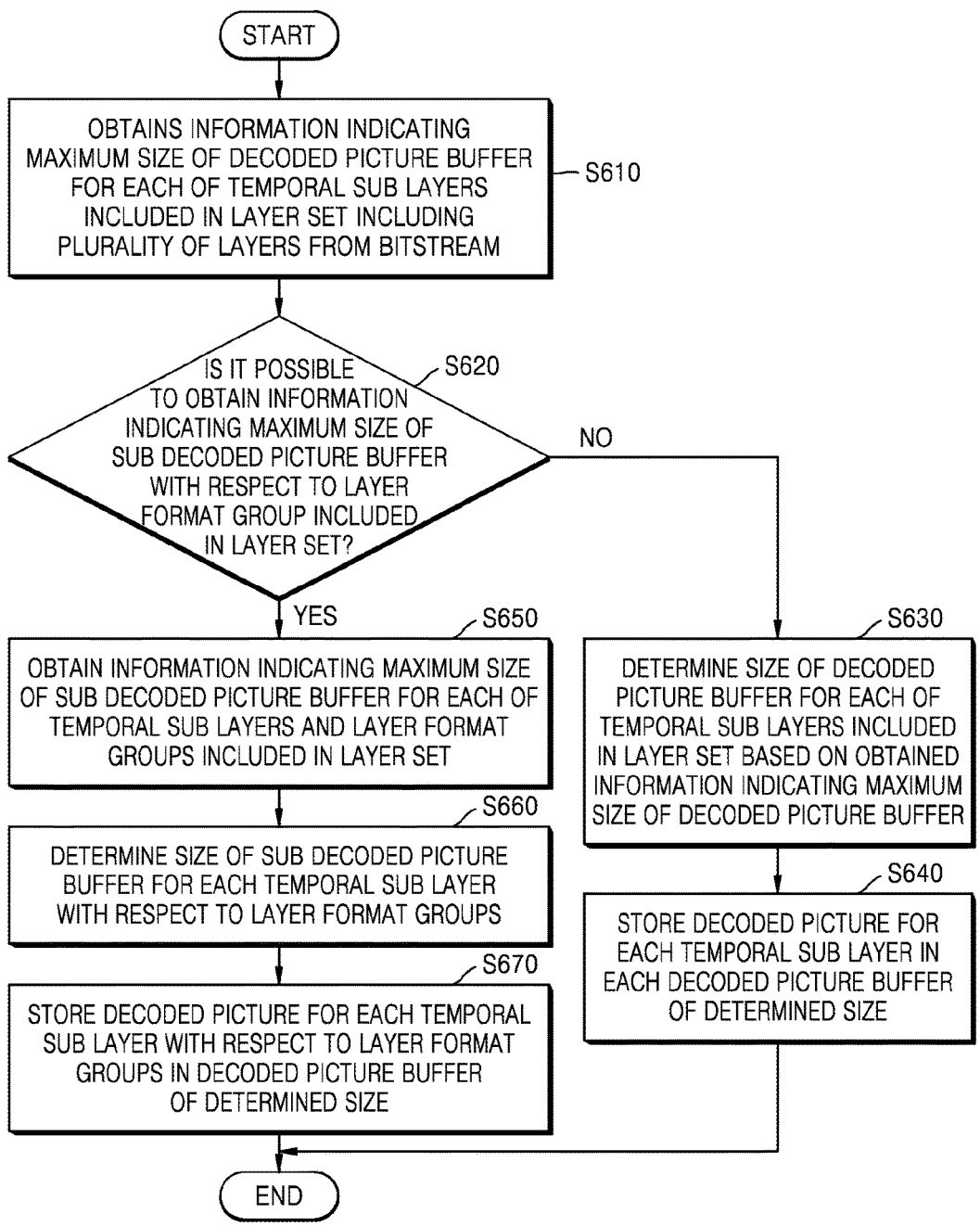
FIG. 6A is a flowchart for describing a buffer management method for decoding of a multilayer video according to various embodiments.

FIG. 6A is a flowchart for describing a buffer management method for decoding of a multilayer video according to various embodiments.

In operation S610, the multilayer video decoding apparatus 20 obtains information indicating a maximum size of a decoded picture buffer for each of temporal sub layers included in a layer set including a plurality of layers from a bitstream. For example, the multilayer video decoding apparatus 20 may obtain information max_dpb_size_for_layer_set_minus1 [i][j] indicating the maximum size of the decoded picture buffer for each of the temporal sub layers included in the layer set. In this regard, j denotes an index of the layer set and j may denote a highest level value hightestTid of a temporal index Temporalid that may be used in a temporal sub layer.

In operation S620, the multilayer video decoding apparatus 20 determines whether it is possible to obtain information indicating a maximum size of a sub decoded picture buffer with respect to a layer format group included in the layer set. For example, the multilayer video decoding apparatus 20 may obtain information max_dpb_size_for_rep_format_idx_present_flag[i][j] indicating whether information regarding a size of the sub decoded picture buffer is present with respect to the layer format group for each of temporal sub layers included in the layer set.

In this regard, a format group may mean a group that subdivides layer image sequences included in the layer set based on resolution, a bit depth, or an image format such as a color format.

For example, FIG. 6B illustrates an example of determining a layer format group. Referring to FIG. 6B, layers having the same resolution, bit depth, and color format may be included in a layer set 601. Thus, the multilayer video encoding apparatus 10 may determine a first layer and a second layer having the same format as a first layer format group 602 and a third layer and a fourth layer as a second layer format group 603 so as to efficiently manage the decoded picture buffer. The maximum size of the sub decoded picture buffer may be determined for each of the determined layer format group. Thus, the decoded picture buffer with respect to the layer set may include a plurality of sub picture buffers.

Meanwhile, the layer format group is determined based on the layer format in the description with reference to FIG. 6B, but is not particularly limited thereto. Layers included in a layer set may be grouped according to a different reference such that a sub decoded picture buffer may be efficiently configured with respect to the layers.

Referring back to FIG. 6A, when it is impossible to obtain the information indicating the maximum size of the sub decoded picture buffer (max_dpb_size_for_rep_format_idx_ present_flag[i][j] is 0 or is not signaled), in operation S630, the multilayer video decoding apparatus 20 may determine a size of the decoded picture buffer for each of the temporal sub layers included in the layer set based on the obtained information indicating the maximum size of the decoded picture buffer. In operation S640, a decoded picture for each temporal sub layer is stored in each decoded picture buffer of the determined size.

In operation S650, when it is possible to obtain the information indicating the maximum size of the sub decoded picture buffer (max_dpb_size_for_rep_format_idx_present_flag[i][j] is 1), the multilayer video decoding apparatus 20 may obtain information max_dpb_size_for_rep_format_idx_minus1 [i][j][k] indicating the maximum size of the sub decoded picture buffer for each of the temporal sub layers and layer format groups included in the layer set. In this regard, k may denote an index of layer format groups. Alternatively, k may denote an index of sub decoded picture buffers.

In operation S660, the multilayer video decoding apparatus 20 may determine the size of the sub decoded picture buffer for each temporal sub layer with respect to the layer format groups. For example, based on the information max_dpb_size_for_rep_format_idx_minus1 [i][j][k] indicating the maximum size of the sub decoded picture buffer, the size of the sub decoded picture buffer may be determined for each of a layer set i, a temporal sub layer j, and a layer format group k.

In operation S670, the multilayer video decoding apparatus 20 may store a decoded picture for each temporal sub layer with respect to the layer format groups in the sub decoded picture buffer of the determined size.

In FIG. 6A, the information indicating the maximum size of the sub decoded picture buffer is obtained after obtaining the information indicating the maximum size of the decoded picture buffer with respect to the layer set but the present disclosure is not necessarily limited thereto.

For example, instead of operation S610 of FIG. 6A, the multilayer video decoding apparatus 20 may obtain information indicating whether a temporal sub layer is present in a layer set including a plurality of layers from the bitstream. For example, information sub_layer_flag_info_present_flag indicating whether the temporal sub layer is present may be obtained for each layer set.

Therefore, the multilayer video decoding apparatus may obtain information indicating a maximum size of each sub decoded picture buffer when information regarding the sub decoded picture buffer is present. In this case, an operation of obtaining information indicating a maximum size of a decoded picture buffer with respect to all layer sets may be omitted.

FIG. 7A illustrates an example of a syntax 700 related to a size of a buffer for decoding a multilayer video according to various embodiments.

A syntax vps_extension( ) 701 for a VPS extension may include conditional sentences 702 through 705 for determining a maximum size of a decoded picture buffer with respect to a layer set.

In the conditional sentence 701, the multilayer video decoding apparatus 20 may determine the conditional sentence 703 for each index i of layer sets based on information vps_num_layer_sets_minus1 indicating the number of layer sets.

In the conditional sentence 703, the multilayer video decoding apparatus 20 may obtain information max_dpb_size_for_layer_set_minus1 [i][j] indicating a maximum size of the decoded picture buffer for each temporal sub layer based on information vps_max_sub_layers_minus1 indicating the number of temporal sub layers. In this regard, j may be the same as a highest level value HightesetTid of a temporal index Temporalid that may be used in each temporal sub layer. Thus, if j is greater than 0, max_dpb_size_for_layer_set_minus1[i][j] may be the same as or greater than max_dpb_size_for_layer_set_minus1[i][j−1].

In the conditional sentence 704, the multilayer video decoding apparatus 20 may determine if information max_dpb_size_for_rep_format_idx_present_flag[i][j] indicating whether size information of a sub decoded picture buffer with respect to layer format groups for each of temporal sub layers included in the layer sets is present is 1.

If max_dpb_size_for_rep_format_idx_present_flag[i][j] is 1, according to the conditional sentence 705, the multilayer video decoding apparatus 20 may obtain information max_dpb_size_for_rep_format_idx_minus1 [i][j][k] indicating a maximum size of a sub decoded picture buffer for each of temporal sub layers and layer format groups included in the layer sets.

To the contrary, the multilayer video decoding apparatus 20 may not obtain information max_dpb_size_for_rep_format_idx_minus1 [i][j][k] indicating a maximum size of a sub decoded picture buffer in which max_dpb_size_for_rep_format_idx_present_flag[i][j] is 0.

In this regard, k may be an index of a sub decoded picture buffer determined based on information vps_num_rep_format_minus1 indicating the number of layer format groups. When j is greater than 0, max_dpb_size_for_rep_format_idx_minus1 [i][j][k] may be a value greater than or the same as max_dpb_size_for_rep_format_idx_minus1[i][j−1][k].

FIG. 7B illustrates another example of a syntax 710 related to a size of a buffer for decoding a multilayer video according to various embodiments.

Referring to FIG. 7B, a syntax dpb_size( ) 711 for determining a size of a decoded picture buffer may include conditional sentences 712 through 716 for determining a maximum size of the decoded picture buffer with respect to a layer set.

In the conditional sentence 712, the multilayer video decoding apparatus 20 may obtain information sub_layer_flag_info_present_flag[i] indicating if a temporal sub layer is present for each index i of layer sets determined based on information NumOutputLayersets indicating the number of layer sets.

In the conditional sentence 713, conditional sentences 714 through 716 are determined for each index j of temporal sub layers based on MaxSubLayerInlayerSetMinus1 derived from sub_layer_flag_info_present_flag[i]. In this regard, j may be the same as a highest level value HightesTid of a temporal index Temporalid that may be used in each temporal sub layer.

In the conditional sentence 714, when j is greater than 0, and the temporal sub layer is present sub_layer_flag_info_present_flag [i]=1, information sub_layer_dpb_info_present_flag[i][j] indicating whether information regarding the sub decoded picture buffer is present may be obtained.

In the conditional sentence 715, when sub_layer_dpb_info_present_flag[i][j] is 1, a condition of the conditional sentence 716 is determined.

In the conditional sentence 716, information max_vps_dec_pic_buffering_minus1 [i][j][k] indicating a size of the sub decoded picture buffer for each index k of sub decoded picture buffers determined based on the number NumSubDpbs[LayerSetIdxForOutputLayerSet[i]] of sub decoded picture buffers included in layer sets may be obtained.

Thus, the multilayer video decoding apparatus 20 may determine the size of the sub decoded picture buffer for each of the layer sets i, each of the temporal sub layers j and each of the layer format groups k based on max_vps_dec_pic_buffering_minus1[i][j][k].

Meanwhile, for convenience of description, although operations performed by the multilayer video decoding apparatus 20 are described whereas operations performed by the multilayer video encoding apparatus 10 are omitted in FIGS. 5A through 7B, it can be easily understood by one of ordinary skill in the art to which the present embodiment pertains that the multilayer video encoding apparatus 10 may perform the corresponding operations.

As described above, the multilayer video encoding apparatus 10 and the multilayer video decoding apparatus 20 according to various embodiments split blocks of divided video data into coding units of a tree structure, and encoding units, prediction units, and transformation units are used for inter-layer prediction or inter-prediction of the coding unit. Hereinafter, with reference to FIGS. 8 through 20, a video encoding method and apparatus therefor, and a video decoding method and apparatus therefor, based on coding units and transformation units of a tree structure according to various embodiments, are described.

Basically, in an encoding/decoding procedure for a multilayer video, an encoding/decoding procedure for first layer images, and an encoding/decoding procedure for second layer images are separately performed. That is, when inter-layer prediction occurs in the multilayer video, encoding/decoding results of a single layer video may be mutually referred to, but an encoding/decoding procedure is performed for each of single layer videos.

Therefore, for convenience of description, a video encoding procedure and a video decoding procedure based on coding units of a tree structure that are described layer with reference to FIGS. 8 through 20 are a video encoding procedure and a video decoding procedure for a single layer video, thus, inter-prediction and motion compensation are described in detail. However, as described above with reference to FIGS. 1A through 7, for encoding/decoding a video stream, inter-layer prediction and compensation between base layer images and second layer images may be performed.

Figure 8:
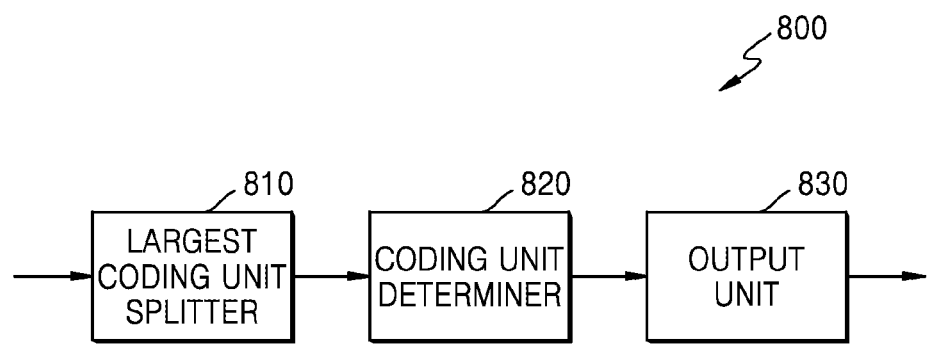
FIG. 8 is a block diagram of a video encoding apparatus based on coding units of a tree structure, according to various embodiments.

Therefore, in order for the encoder of the multilayer video encoding apparatus according to various embodiments to encode a multilayer video, based on coding units of a tree structure, video encoding apparatuses 800 of FIG. 8 corresponding to the number of layers of a multilayer video so as to perform video encoding on each of single layer videos, and may control the video encoding apparatuses 800 to encode the single layer videos, respectively. Also, the multilayer video encoding apparatus may perform inter-view prediction by using encoding results with respect to discrete single views obtained by the video encoding apparatuses 800. Accordingly, the encoder of the multilayer video encoding apparatus may generate a base layer video stream and a second layer video stream that include an encoding result of each layer.

Figure 9:
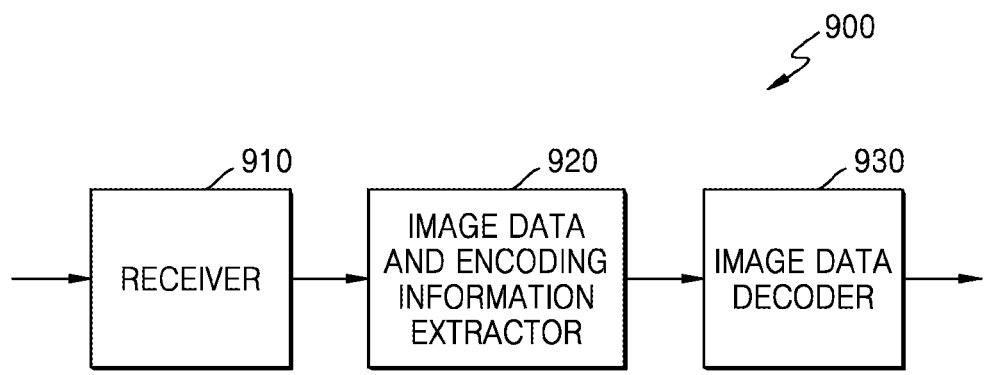
FIG. 9 is a block diagram of a video decoding apparatus based on coding units of a tree structure, according to various embodiments.

Similarly, in order for the decoder of the multilayer video decoding apparatus to decode a multilayer video, based on coding units of a tree structure, the decoder may include video decoding apparatuses 900 of FIG. 9 corresponding to the number of layers of a multilayer video so as to perform video decoding on each of layers of a received first layer video stream and a received second layer video stream, and may control the video decoding apparatuses 900 to decode single layer videos, respectively. Then, the multilayer video decoding apparatus may perform inter-layer compensation by using decoding results with respect to discrete single layers obtained by the video decoding apparatuses 900. Accordingly, the decoder of the multilayer video decoding apparatus may generate first layer images and second layer images that are reconstructed for each of the layers.

FIG. 8 is a block diagram of the video encoding apparatus 800 based on coding units of a tree structure, according to various embodiments.

The video encoding apparatus 800 involving video prediction based on coding units of the tree structure includes a coding unit determiner 820 and an output unit 830. Hereinafter, for convenience of description, the video encoding apparatus 800 involving video prediction based on coding units of the tree structure according to various embodiments is referred as ' video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to various embodiments may be a data unit having a size of 32×32, 64×64, 128×128, 256×256, etc., wherein a shape of the data unit is a square having a width and length in squares of 2.

A coding unit according to various embodiments may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to various embodiments is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. In other words, the coding unit determiner 820 determines a final depth by encoding the image data in the deeper coding units according to depths, according to the largest coding unit of the current picture, and selecting a depth having the least encoding error. The determined final depth and the encoded image data according to the determined depth are output to the output unit 830.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to various embodiments may determine coding units having a tree structure included in the largest coding unit. The 'coding units having a tree structure' according to various embodiments include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to various embodiments is an index related to the number of splitting times from a largest coding unit to a smallest coding unit. A first maximum depth according to various embodiments may denote the total number of splitting times from the largest coding unit to the smallest coding unit. A second maximum depth according to various embodiments may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 800 according to various embodiments may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a final depth according to various embodiments, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to various embodiments may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 according to various embodiments may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit according to various embodiments may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit according to various embodiments. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information corresponding to a depth requires not only information about the depth, but also about information related to prediction encoding and transformation. Accordingly, the coding unit determiner 820 not only determines a depth having a least encoding error, but also determines a partition mode in a prediction unit, a prediction mode according to prediction units, and a size of a transformation unit for transformation.

Coding units according to a tree structure in a largest coding unit and methods of determining a prediction unit/partition, and a transformation unit, according to various embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs the image data of the largest coding unit, which is encoded based on the at least one depth determined by the coding unit determiner 820, and split information according to the depth, in bitstreams.

The encoded image data may be obtained by encoding residual data of an image.

The split information according to the depth may include information about the depth, about the partition mode in the prediction unit, the prediction mode, and the size of the transformation unit.

The information about the final depth may be defined by using split information according to depths, which indicates whether encoding is performed on coding units of a lower depth instead of a current depth. If the current depth of the current coding unit is the depth, image data in the current coding unit is encoded and output, and thus the split information may be defined not to split the current coding unit to a lower depth. Alternatively, if the current depth of the current coding unit is not the depth, the encoding is performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information is determined for a coding unit of a depth, information about at least one encoding mode may be determined for one largest coding unit. Also, a depth of the image data of the largest coding unit may be different according to locations since the image data is hierarchically split according to depths, and thus the depth and the split information may be set for the image data.

Accordingly, the output unit 830 according to various embodiments may assign encoding information about a corresponding depth and an encoding mode to at least one of the coding unit, the prediction unit, and a minimum unit included in the largest coding unit.

The minimum unit according to various embodiments is a square data unit obtained by splitting the smallest coding unit constituting the lowermost depth by 4. Alternatively, the minimum unit according to various embodiments may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest various embodiments for the video encoding apparatus 800, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, a current coding unit having a size of 2N×2N may include a maximum of 4 of the coding units with the lower depth having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to various embodiments, image compression efficiency may be increased since a coding unit is adjusted while considering characteristics of an image while increasing a maximum size of a coding unit while considering a size of the image.

The multilayer video encoding apparatus 10 including the configuration described above with reference to FIG. 1A may include the video encoding apparatuses 800 corresponding to the number of layers so as to encode single layer images in each of the layers of a multilayer video. For example, a first layer encoder may include one video encoding apparatus 800, and a second layer encoder may include the video encoding apparatuses 800 corresponding to the number of second layers.

When the video encoding apparatuses 800 encode first layer images, the coding unit determiner 820 may determine a prediction unit for inter-image prediction for each of coding units of a tree structure according to each largest coding unit, and may perform the inter-image prediction on each prediction unit.

When the video encoding apparatuses 800 encode second layer images, the coding unit determiner 820 may determine prediction units and coding units of a tree structure according to each largest coding unit, and may perform inter-prediction on each of the prediction units.

The video encoding apparatus 800 may encode a brightness difference between the first layer image and the second layer image so as to compensate for the brightness difference. However, whether to perform brightness compensation may be determined according to an encoding mode of an encoding unit. For example, brightness compensation may be performed only on a prediction unit of size 2N×2N.

FIG. 9 is a block diagram of a video decoding apparatus 900 based on coding units of a tree structure, according to various embodiments.

The video decoding apparatus 900 involving video prediction based on coding units of the tree structure according to various embodiments includes a receiver 910, an image data and encoding information extractor 920, and an image data decoder 930. Hereinafter, for convenience of description, the video decoding apparatus 900 involving video prediction based on coding units of the tree structure according to various embodiments is referred as ' video decoding apparatus 900'.

Definitions of various terms, such as a coding unit, a depth, a prediction unit, a transformation unit, and information about various encoding modes, for decoding operations of the video decoding apparatus 900 according to various embodiments are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information for the coding units having a tree structure according to each largest coding unit, from the parsed bitstream. The extracted final depth and split information are output to the image data decoder 930. That is, the image data in a bit stream is split into the largest coding unit so that the image data decoder 930 decodes the image data for each largest coding unit.

The depth and split information according to the largest coding unit may be set for information about at least one depth, and split information according to depths may include split information about a partition node of a corresponding coding unit corresponding to the depth, about a prediction mode, and a transformation unit. Also, split information according to depths may be extracted as the information about the depth.

The depth and split information according to each largest coding unit extracted by the image data and encoding information extractor 920 is a depth and split information determined to generate a minimum encoding error when an encoder, such as the video encoding apparatus 800 according to various embodiments, repeatedly performs encoding for each deeper coding unit according to depths according to each largest coding unit. Accordingly, the video decoding apparatus 900 may reconstruct an image by decoding the image data according to a depth and an encoding mode that generates the minimum encoding error.

Since encoding information about the depth and the encoding mode according to various embodiments may be assigned to a predetermined data unit from among a corresponding coding unit, a prediction unit, and a minimum unit, the image data and encoding information extractor 920 may extract the depth and split information according to the predetermined data units. If depth and split information of a corresponding largest coding unit is recorded according to predetermined data units, the predetermined data units to which the same depth and split information is assigned may be inferred to be the data units included in the same largest coding unit.

The image data decoder 930 reconstructs the current picture by decoding the image data in each largest coding unit based on the depth and split information according to the largest coding units. In other words, the image data decoder 930 may decode the encoded image data based on the extracted information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition mode and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode encoded data in the current largest coding unit by using the information about the partition mode of the prediction unit, the prediction mode, and the size of the transformation unit for each coding unit corresponding to the depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The multilayer video decoding apparatus 20 including the configuration described above with reference to FIG. 2A may include the video decoding apparatuses 900 corresponding to the number of views, so as to decode a received first layer image stream and a received second layer image stream and to reconstruct first layer images and second layer images.

When the first layer image stream is received, the image data decoder 930 of the video decoding apparatus 900 may split samples of the first layer images, which are extracted from the base layer image stream by an extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer image stream is received, the image data decoder 930 of the video decoding apparatus 900 may split samples of the second layer images, which are extracted from the second layer image stream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain information related to a brightness error between the first layer image and the second layer image from a bitstream in order to compensate for the brightness error. However, whether to perform brightness compensation may be determined according to an encoding mode of an encoding unit. For example, brightness compensation may be performed only on a prediction unit of size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimum split information received from an encoder.

Figure 10:
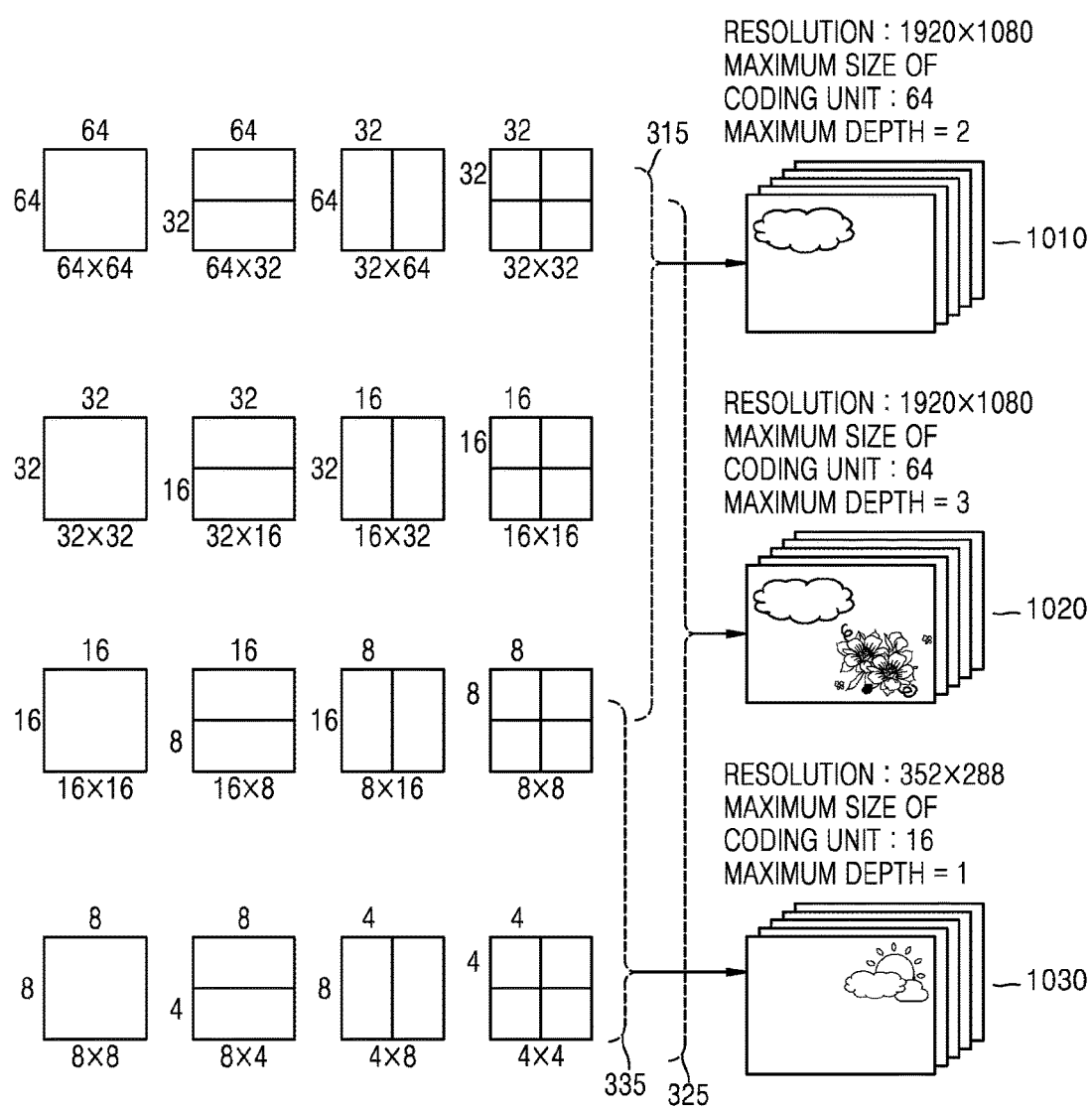
FIG. 10 is a diagram for describing a concept of coding units according to various embodiments.

FIG. 10 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a minimum decoder.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the video data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 10320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
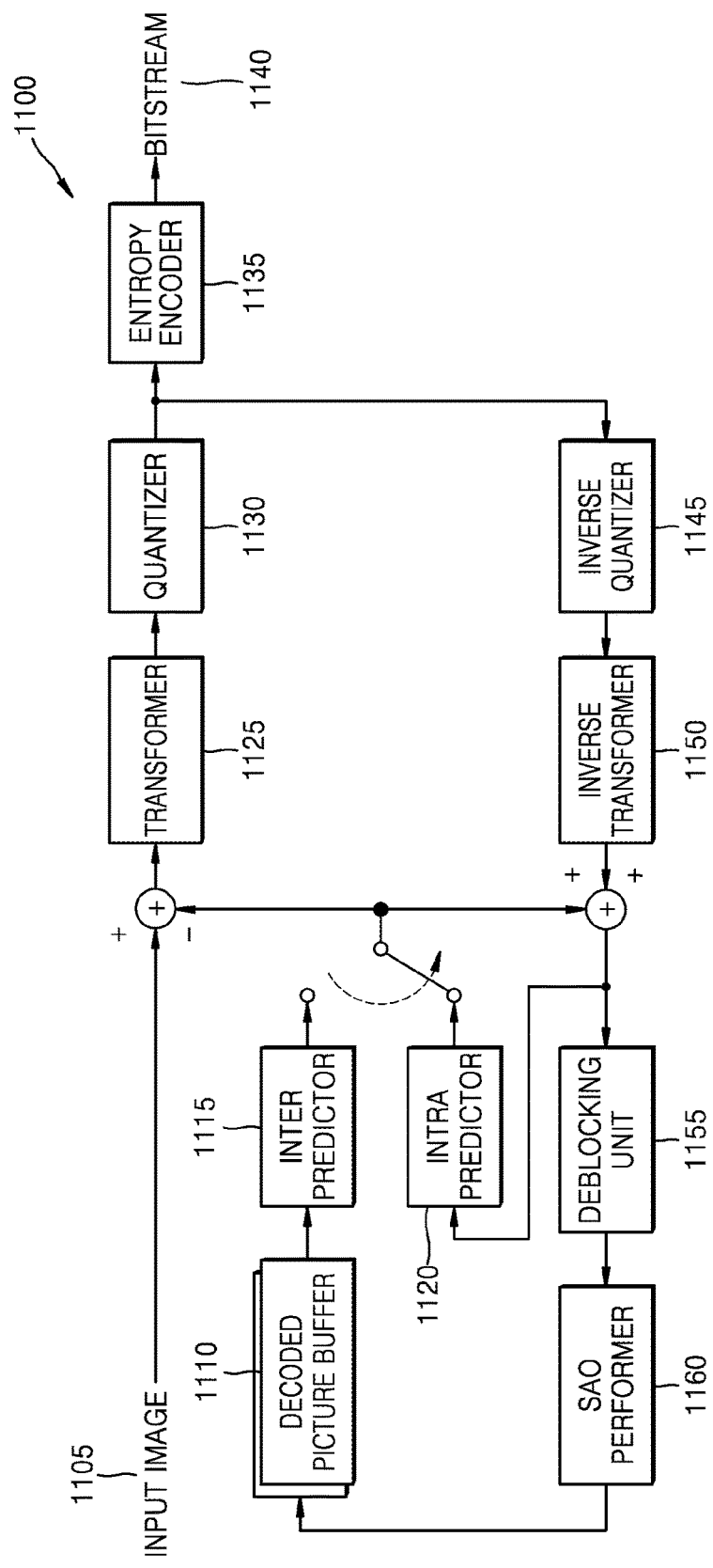
FIG. 11 is a block diagram of an image encoder based on coding units, according to various embodiments.

FIG. 11 is a block diagram of a video encoder 1100 based on coding units, according to various embodiments.

The video encoder 1100 according to various embodiments performs operations of a picture encoder 1520 of the video encoding apparatus 800 to encode image data. In other words, an intra predictor 1120 performs intra prediction on coding units in an intra mode, from among a current image 1105 for each prediction unit, and an inter predictor 1115 performs inter prediction on coding units in an inter mode by using the current image 1105 and a reference image obtained by a reconstructed picture buffer 1110 for each prediction unit. The current image 1105 may be split into largest coding units and then encoding may be sequentially performed. In this regard, encoding may be performed on coding units into which largest coding units are to be split in the tree structure.

Residue data is generated by subtracting prediction data with respect to coding units in each mode output from the intra predictor 1120 or the inter predictor 1115 from data regarding encoded coding units of the current image 1105, and is output as a quantized transformation coefficient for each transformation unit through a transformer 1125 and a quantizer 1130. The quantized transformation coefficient is reconstructed as data in a spatial domain through an inverse quantizer 1145 and an inverse transformer 1150. The reconstructed data in the spatial domain is added to the prediction data with respect to coding units in each mode output from the intra predictor 1120 or the inter predictor 1115 and thus is reconstructed as data of the spatial domain with respect to coding units of the current image 1105. The reconstructed data of the spatial domain is generated as a reconstruction image through a deblocking unit 1155 and a SAO performer 1160. The generated reconstruction image is stored in the reconstructed picture buffer 1110. Reconstruction images stored in the reconstructed picture buffer 1110 may be used as reference images for inter prediction of other images. The transformation coefficient quantized through the transformer 1125 and the quantizer 1130 may be output as a bitstream 1140 through an entropy encoder 1135.

In order for the video encoder 1100 to be applied in the video encoding apparatus 1800, all elements of the video encoder 1100, i.e., the inter predictor 1115, the intra predictor 1120, the transformer 1125, the quantizer 1130, the entropy encoder 1135, the inverse quantizer 1145, the inverse transformer 1150, the deblocking unit 1155, and the SAO performer 1160 may perform operations based on each coding unit among coding units having a tree structure while the maximum depth of each largest coding unit is considered.

In particular, the inter predictor 1115 and the intra predictor 1120 determine partition modes and a prediction mode of each coding unit from among the coding units having a tree structure while considering the maximum size and the maximum depth of a current largest coding unit, and the transformer 1125 may determine whether to split the transformation unit according to a quad tree structure in each coding unit from among the coding units having a tree structure.

Figure 12:
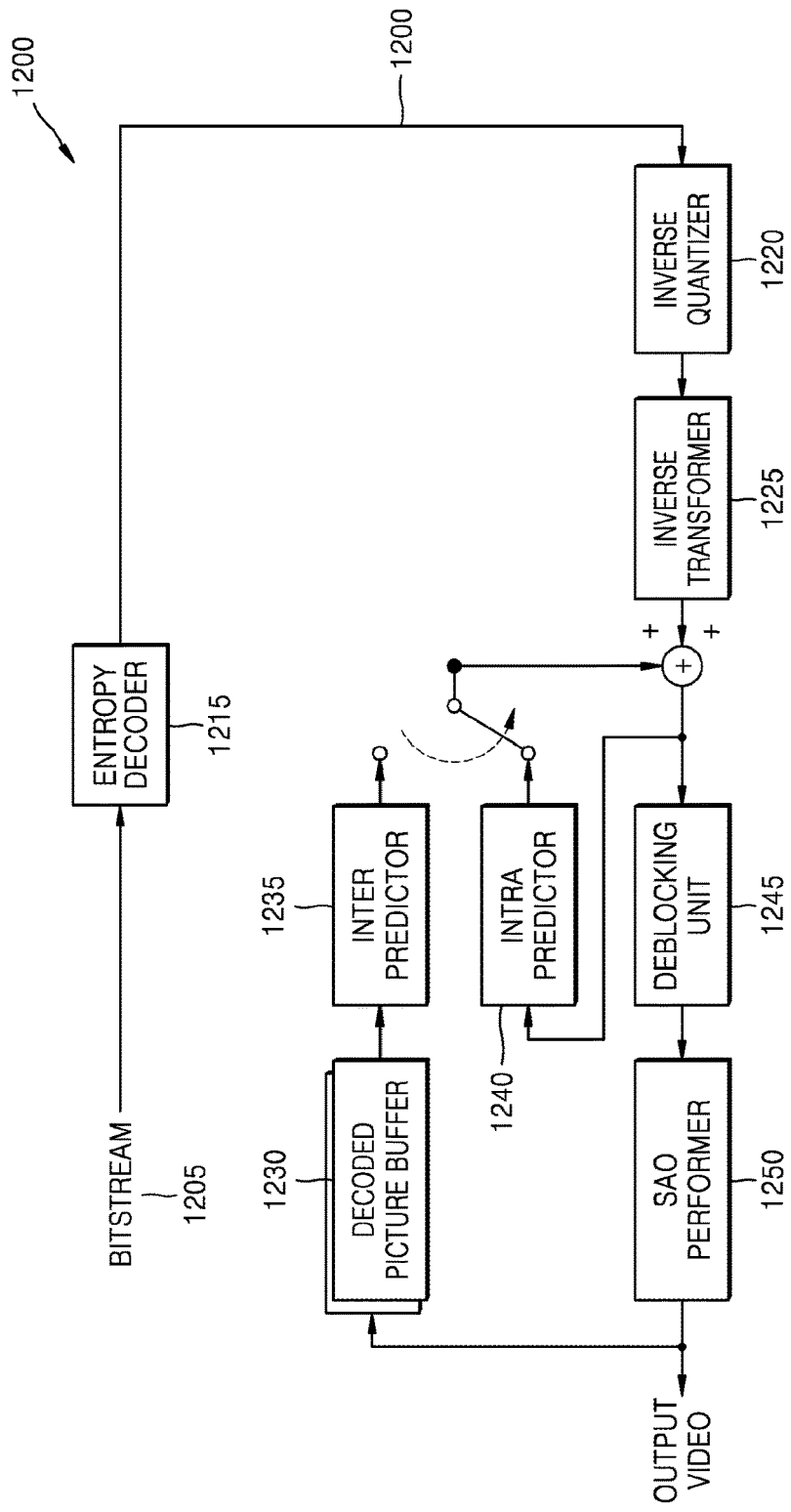
FIG. 12 is a block diagram of an image decoder based on coding units, according to various embodiments.

FIG. 12 is a block diagram of a video decoder 1200 based on coding units, according to various embodiments.

An entropy decoder 1215 parses encoded image data to be decoded and information about encoding required for decoding from a bitstream 1205. The encoded image data is quantized transformation coefficients from which an inverse quantizer 1220 and an inverse transformer 1225 reconstruct residue data.

An intra predictor 1240 performs intra prediction on coding units in an intra mode. An inter predictor 1235 performs inter prediction on coding units in an inter mode among a current image by using a reference image obtained by a reconstructed picture buffer 1230 for each prediction unit.

Prediction data with respect to coding units in each mode through the intra predictor 1240 or the inter predictor 1235 and the residue data are added, and thus data of a spatial domain with respect to coding units of the current image 1105 is reconstructed. The reconstructed data of the spatial domain is generated as a reconstruction image 1260 through a deblocking unit 1245 and a SAO performer 1250. Reconstruction images stored in the reconstructed picture buffer 1230 may be output as reference images.

In order to decode the image data in the picture decoder 930 of the video decoding apparatus 900, the picture decoder 930 may perform operations that are performed after the entropy decoder 1215 of the video decoder 1200 according to various embodiments.

In order for the video decoder 1200 to be applied in the video decoding apparatus 900 according to various embodiments, all elements of the video decoder 1200, i.e., the entropy decoder 1215, the inverse quantizer 1220, the inverse transformer 1225, the intra predictor 1240, the inter predictor 1235, the deblocking unit 1245, and the SAO performer 1250 may perform operations based on each coding unit among coding units having a tree structure for each largest coding unit.

In particular, the intra predictor 1240 and the inter predictor 1235 may determine a partition mode and a prediction mode for each of the coding units having a tree structure, and the inverse transformer 1225 may determine whether to split a transformation unit according to a quad tree structure for each coding unit.

The encoding operation of FIG. 10 and the decoding operation of FIG. 11 are described as a video stream encoding operation and a video stream decoding operation, respectively, in a single layer. Therefore, if the multilayer video encoding apparatus 10 of FIG. 1A encodes a video stream having at least two layers, the base layer encoder 11 may include the image encoder 1100 for each of layers. Similarly, if the multilayer video decoding apparatus 20 of FIG. 2A decodes a video stream having at least two layers, the enhancement layer decoder 23 may include the image decoder 1200 for each of layers.

Figure 13:
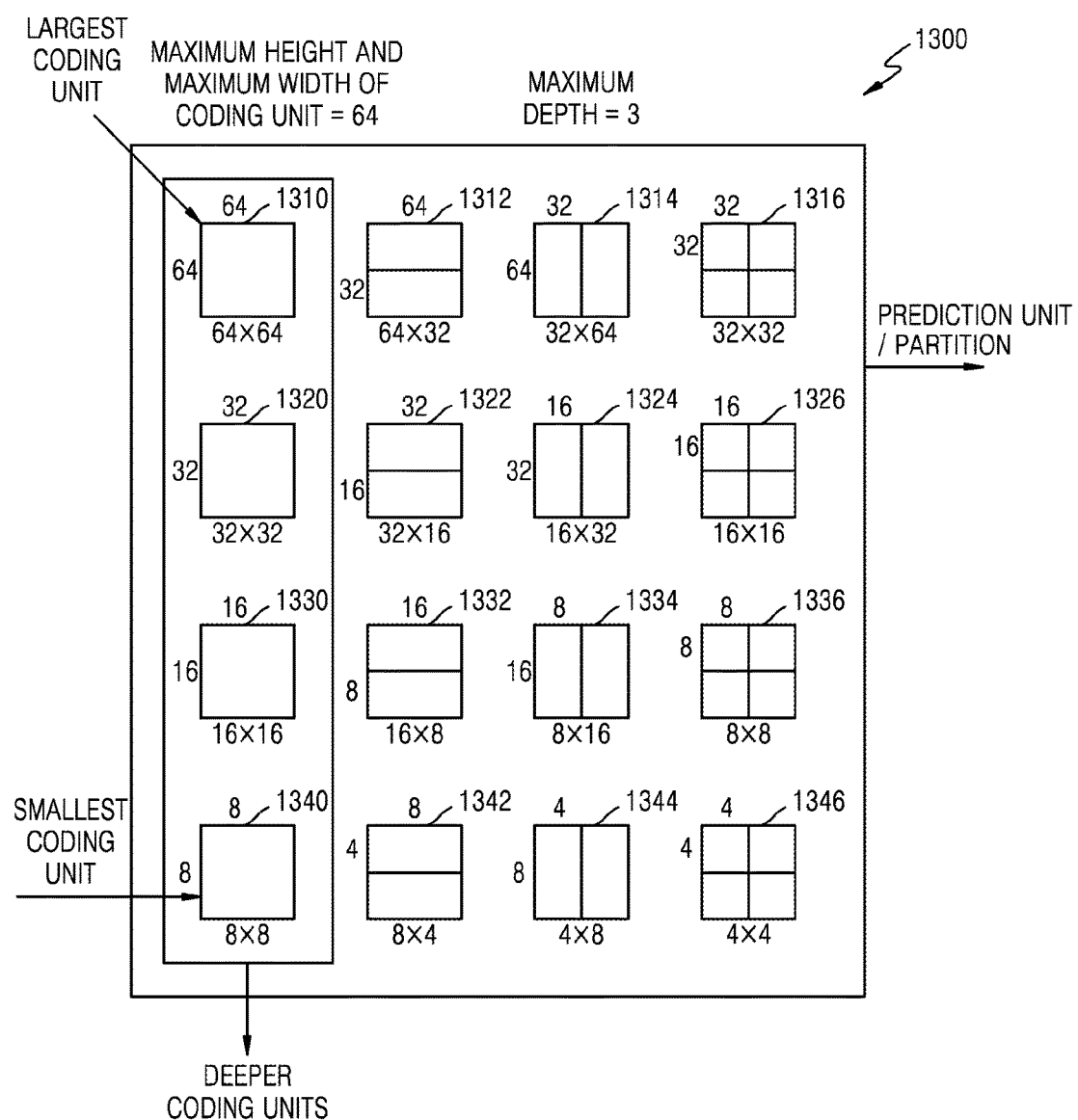
FIG. 13 is a diagram illustrating deeper coding units according to depths, and partitions, according to various embodiments.

FIG. 13 is a diagram illustrating deeper coding units according to depths, and partitions, according to various embodiments.

The video encoding apparatus 8100 according to various embodiments and the video decoding apparatus 2900 according to various embodiments use hierarchical coding units so as to consider characteristics of an image. A maximum height, a maximum width, and a maximum depth of coding units may be adaptively determined according to the characteristics of the image, or may be differently set according to a user request. Sizes of deeper coding units according to depths may be determined according to the predetermined maximum size of the coding unit.

In a hierarchical structure 1300 of coding units according to various embodiments, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure 1300 of coding units according to various embodiments, a height and a width of the deeper coding unit are each split. Also, a prediction unit and partitions, which are bases for prediction encoding of each deeper coding unit, are shown along a horizontal axis of the hierarchical structure 1300 of coding units.

In other words, a coding unit 1310 is a largest coding unit in the hierarchical structure 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions included in the coding unit 1310 having a size of 64×64, i.e. a partition 1310 having a size of 64×64, partitions 1312 having the size of 64×32, partitions 1314 having the size of 32×64, or partitions 1316 having the size of 32×32.

Similarly, a prediction unit of the coding unit 1320 having the size of 32×32 and the depth of 1 may be split into partitions included in the coding unit 1320 having a size of 32×32, i.e. a partition 1320 having a size of 32×32, partitions 1322 having a size of 32×16, partitions 1324 having a size of 16×32, and partitions 1326 having a size of 16×16.

Similarly, a prediction unit of the coding unit 1330 having the size of 16×16 and the depth of 2 may be split into partitions included in the coding unit 1330 having a size of 16×16, i.e. a partition 1330 having a size of 16×16, partitions 1332 having a size of 16×8, partitions 1334 having a size of 8×16, and partitions 1336 having a size of 8×8.

Similarly, a prediction unit of the coding unit 1340 having the size of 8×8 and the depth of 3 may be split into partitions included in the coding unit 1340 having a size of 8×8, i.e. a partition 1340 having a size of 8×8, partitions 1342 having a size of 8×4, partitions 1344 having a size of 4×8, and partitions 1346 having a size of 4×4.

In order to determine the at least one depth of the coding units constituting the largest coding unit 1310, the coding unit determiner 820 of the video encoding apparatus 800 according to various embodiments performs encoding for coding units corresponding to each depth included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error that is a representative encoding error may be selected for the current depth by performing encoding for each prediction unit in the coding units corresponding to the current depth, along the horizontal axis of the hierarchical structure 1300. Alternatively, the minimum encoding error may be searched for by comparing representative encoding errors according to depths, by performing encoding for each depth as the depth deepens along the vertical axis of the hierarchical structure 1300. A depth and a partition having the minimum encoding error in the coding unit 1310 may be selected as the depth and a partition mode of the coding unit 1310.

Figure 14:
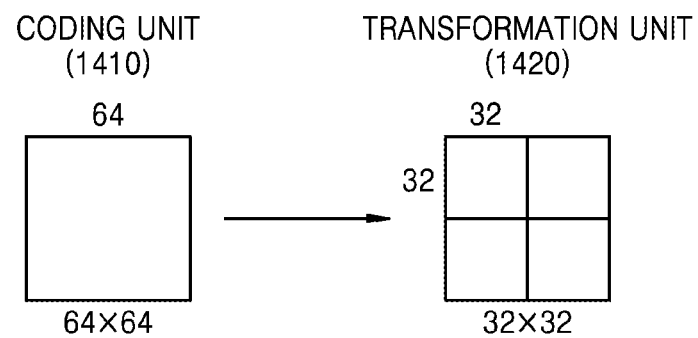
FIG. 14 is a diagram for describing a relationship between a coding unit and transformation units, according to various embodiments.

FIG. 14 is a diagram for describing a relationship between a coding unit 1410 and transformation units 1420, according to various embodiments.

The video encoding apparatus 800 according to various embodiments or the video decoding apparatus 900 according to various embodiments encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 according to various embodiments or the video decoding apparatus 800 according to various embodiments, if a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
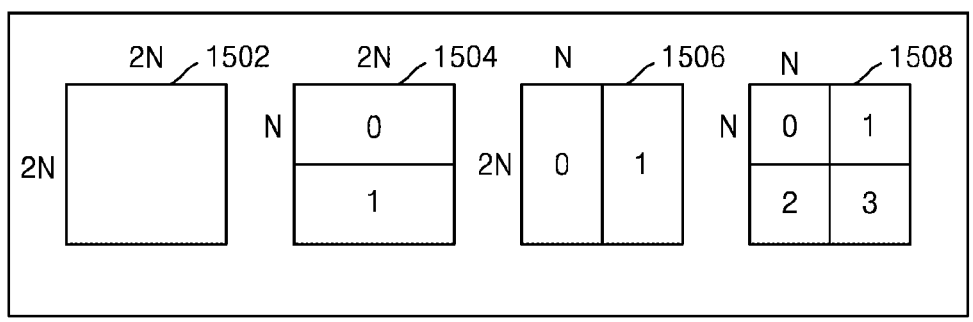
FIG. 15 illustrates a plurality of pieces of encoding information, according to various embodiments.
Figure 15:
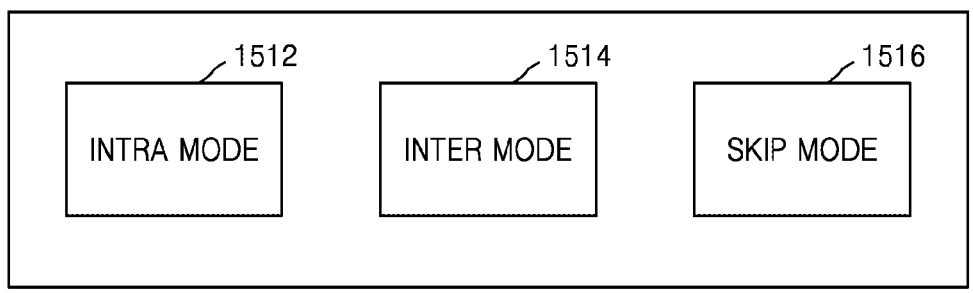
Figure 15:
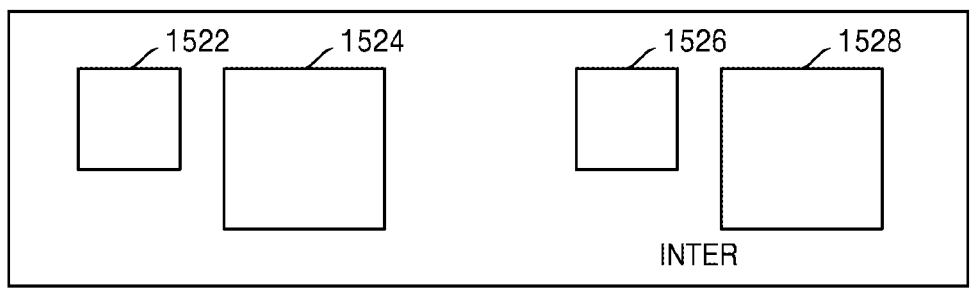

FIG. 15 illustrates a plurality of pieces of encoding information, according to various embodiments.

The output unit 830 of the video encoding apparatus 800 according to various embodiments may encode and transmit partition mode information 1500, prediction mode information 1510, and transformation unit size information 1520 for each coding unit corresponding to a depth, as split information.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 of the current coding unit is set to indicate one of the partition 1502 having a size of 2N×2N, the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 1610 of the video decoding apparatus 900 according to various embodiments may extract and use the partition mode information 1500, the prediction mode information 1510, and the transformation unit size information 1520 for decoding, according to each deeper coding unit.

Figure 16:
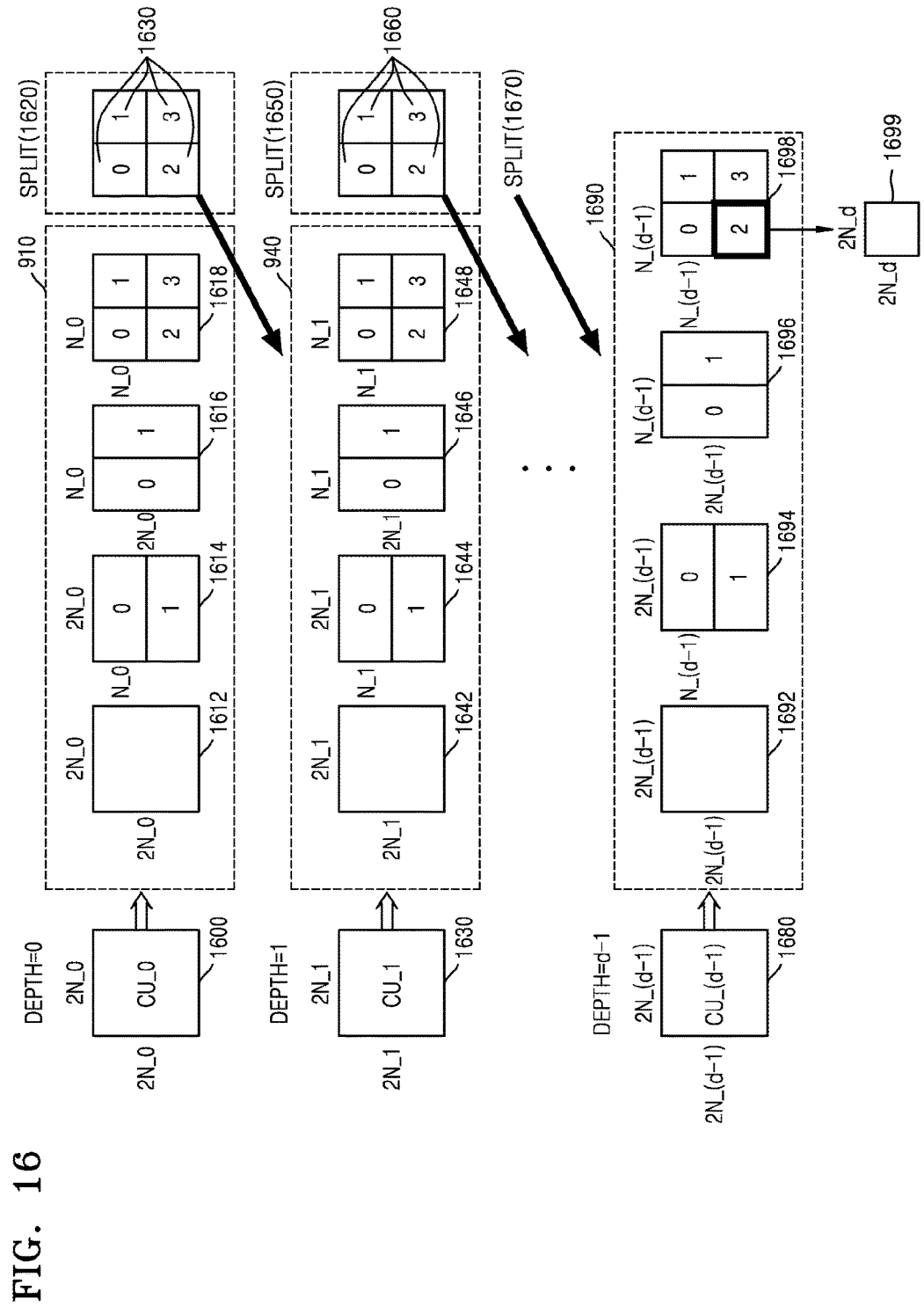
FIG. 16 is a diagram of deeper coding units according to depths, according to various embodiments.

FIG. 16 is a diagram of deeper codigng units according to depths, according to various embodiments.

Split information may be used to indicate a change of a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. FIG. 16 only illustrates the partition modes 1612 through 1618 which are obtained by symmetrically splitting the prediction unit 1610, but a partition mode is not limited thereto, and the partitions of the prediction unit 1610 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 to split the partition mode 1618 in operation 1620, and encoding is repeatedly performed on coding units 1630 having a depth of 2 and a size of N_0×N_0 to search for a minimum encoding error.

A prediction unit 1640 for prediction encoding the coding unit 1630 having a depth of 1 and a size of 2N_1×2N_1 (=N_0×N_0) may include partitions of a partition mode 1642 having a size of 2N_1×2N_1, a partition mode 1644 having a size of 2N_1×N_1, a partition mode 1646 having a size of N_1×2N_1, and a partition mode 9 mode 1648 having a size of N_1×N_1.

If an encoding error is the smallest in the partition mode 1648 having the size of N_1×N_1, a depth is changed from 1 to 2 to split the partition mode 1648 in operation 1650, and encoding is repeatedly performed on coding units 1660, which have a depth of 2 and a size of N_2×N_2 to search for a minimum encoding error.

When a maximum depth is d, a coding unit according to each depth may be performed up to when a depth becomes d−1, and split information may be encoded as up to when a depth is d−2. In other words, when encoding is performed up to when the depth is d−1 after a coding unit corresponding to a depth of d−2 is split in operation 1670, a prediction unit 1690 for prediction encoding a coding unit 1680 having a depth of d−1 and a size of 2N_(d−1)×2N_(d−1) may include partitions of a partition mode 9 mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition mode 1692 through 1698 to search for a partition mode having a minimum encoding error.

Even when the partition mode 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1680 having a depth of d−1 is not set.

A data unit 1699 may be a 'minimum unit' for the current largest coding unit. A minimum unit according to various embodiments may be a square data unit obtained by splitting a smallest coding unit 1680 having a lowermost depth by 4. By performing the encoding repeatedly, the video encoding apparatus 800 according to various embodiments may select a depth having the least encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit is split from a depth of 0 to a depth, only split information of the depth is set to '0', and split information of depths excluding the depth is set to '1'.

The image data and encoding information extractor 920 of the video decoding apparatus 900 according to various embodiments may extract and use the information about the depth and the prediction unit of the coding unit 1600 to decode the partition 1612. The video decoding apparatus 900 according to various embodiments may determine a depth, in which split information is '0', as a depth by using split information according to depths, and use split information of the corresponding depth for decoding.

Figure 17:
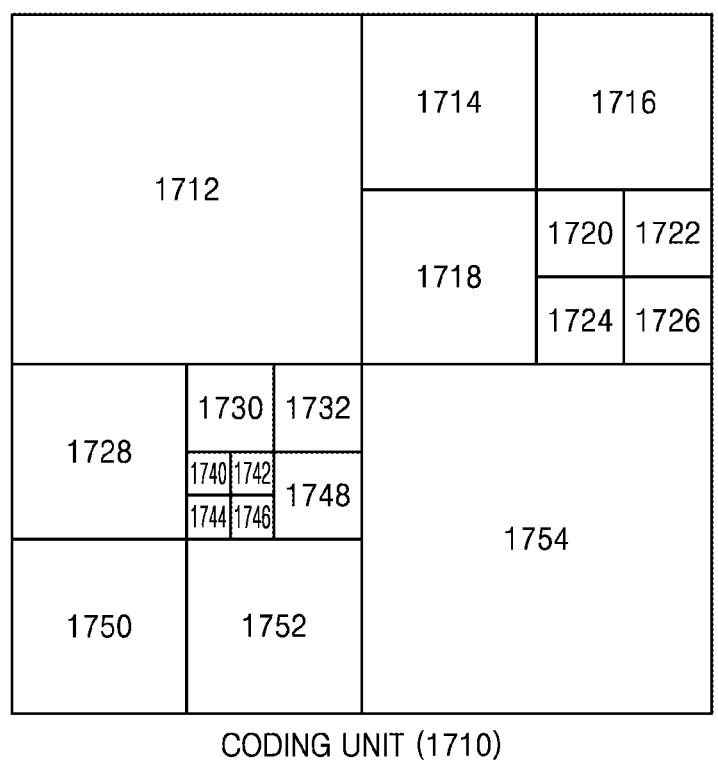
FIGS. 17, 18, and 19 are diagrams for describing a relationship between coding units, prediction units, and transformation units, according to various embodiments.
Figure 18:
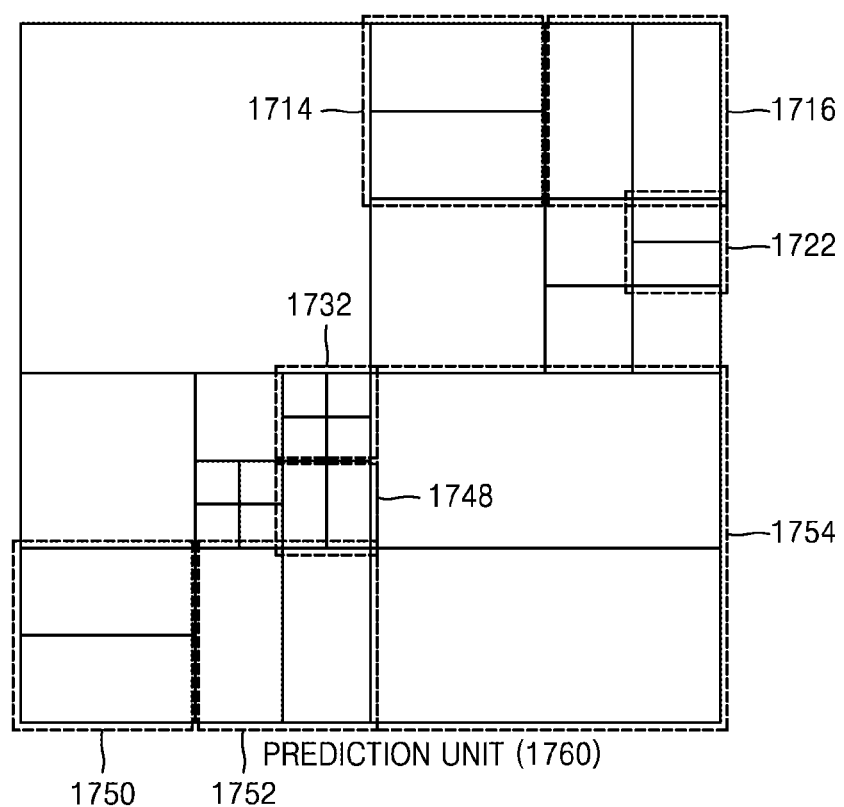
Figure 19:
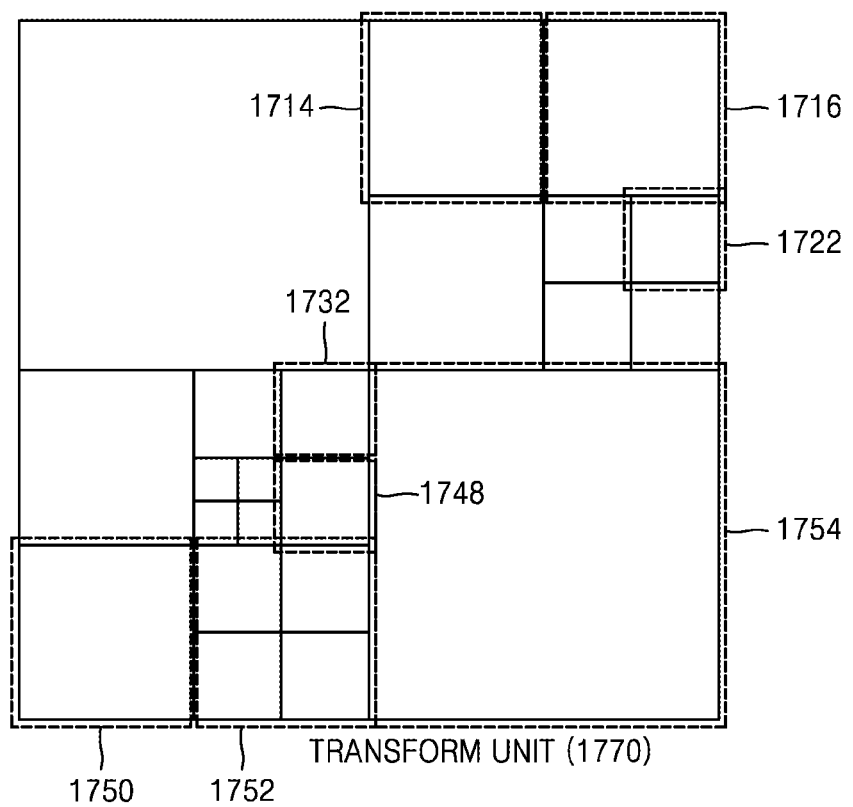

FIGS. 17, 18, and 19 are diagrams for describing a relationship between coding units, prediction units, and transformation units, according to various embodiments.

Coding units 1710 are deeper coding units according to depths determined by the video encoding apparatus 800 according to various embodiments, in a largest coding unit. Prediction units 1760 are partitions of prediction units of each of the coding units 1710, and transformation units 1770 are transformation units of each of the coding units 1710.

When a depth of a largest coding unit is 0 in the coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

In the prediction units 1760, some partitions 1714, 1716, 1722, 1732, 1748, 1750, 1752, and 1754 are obtained by splitting the coding units in the coding units 1710. That is, partition modes in the partitions 1714, 1722, 1750, and 1754 have a size of 2N×N, partition modes in the partitions 1716, 1748, and 1752 have a size of N×2N, and a partition mode of the partition 1732 has a size of N×N. Prediction units and partitions of the coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1770 are data units different from those in the prediction units 1760 in terms of sizes and shapes. In other words, the video encoding apparatus 800 according to various embodiments and the video decoding apparatus 900 according to various embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, information about a partition mode, information about a prediction mode, and information about a size of a transformation unit. Table 1 below shows the encoding information that may be set by the video encoding apparatus 800 according to various embodiments and the video decoding apparatus 900 according to various embodiments.

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Symmetrical Partition mode | Asymmetrical Partition mode | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition mode) N/2 × N/2 (Asymmetrical Partition mode) | Repeatedly Encode Coding Units having Lower Depth of d + 1 |

The output unit 830 of the video encoding apparatus 1800 according to various embodiments may output the encoding information about the coding units having a tree structure, and the image data and encoding information extractor 820 of the video decoding apparatus 800 according to various embodiments may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus information about a partition mode, prediction mode, and a size of a transformation unit may be defined for the depth. If the current coding unit is further split according to the split information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to various embodiments may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be determined.

Accordingly, if a current coding unit is predicted based on encoding information of adjacent data units, encoding information of data units in deeper coding units adjacent to the current coding unit may be directly referred to and used.

In another various embodiments, if a current coding unit is predicted based on encoding information of adjacent data units, data units adjacent to the current coding unit are searched using encoded information of the data units, and the searched adjacent coding units may be referred for predicting the current coding unit.

Figure 20:
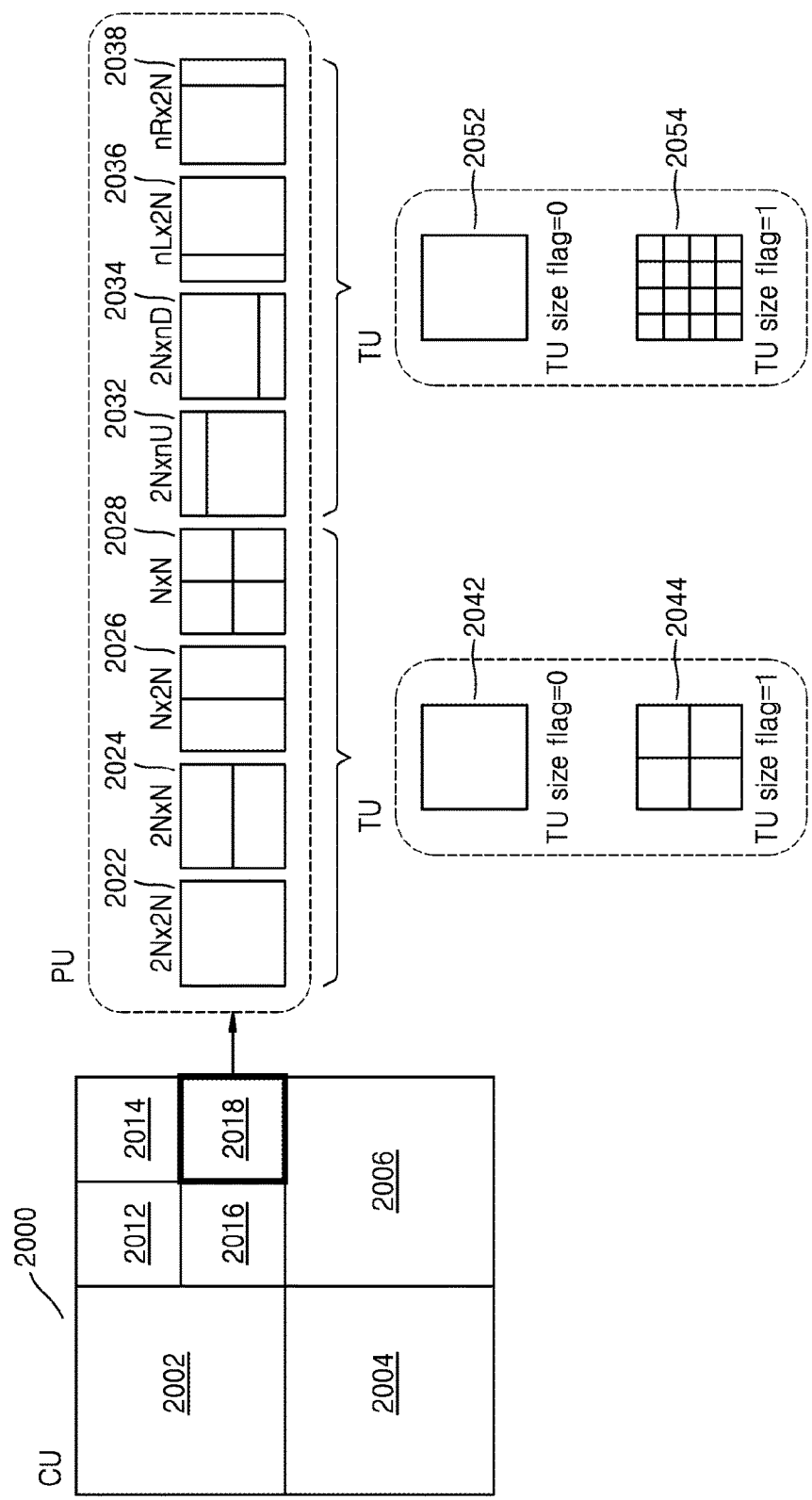
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 33.

A largest coding unit 2000 includes coding units 2002, 2004, 2006, 2012, 2014, 2016, and 2018 of depths. Here, since the coding unit 2018 is a coding unit of a depth, split information may be set to 0. Information about a partition mode of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index. A size of a transformation unit corresponding to the transformation index may be changed according to a prediction unit type or partition mode of the coding unit.

For example, when the information about the partition mode is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N is set.

When the information about the partition mode is set to be one of asymmetrical partition modes 2N×nU 2032, 2N×nD 2034, nL×2N 2036, and nR×2N 2038, if the transformation unit split information is 0, a transformation unit 2052 having a size of 2N×2N may be set, and if the transformation unit split information is 1, a transformation unit 2054 having a size of N/2×N/2 may be set.

As described above with reference to FIG. 19, the transformation unit split information (TU size flag) is a flag having a value or 0 or 1, but the transformation unit split information is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to various embodiments is capable of encoding maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to various embodiments may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize = max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from Among 'RootTuSize/(2^MaxTransformSizeIndex)' and 'MinTransformSize' may be the current minimum transformation unit size 'CurrMinTuSize' that can be determined in the current coding unit.

According to various embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just various embodiments, and a factor for determining the current maximum transformation unit size is not limited thereto.

According to the video encoding method based on coding units of a tree structure described above with reference to FIGS. 8 through 20, image data in a spatial domain is encoded in each of the coding units of the tree structure, and the image data in the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more various embodiments can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

For convenience of description, the multilayer video encoding methods and/or the video encoding method, which are described with reference to FIGS. 1A through 20, will be collectively referred to as 'the video encoding method'. Also, the multilayer video decoding methods and/or the video decoding method, which are described with reference to FIGS. 1A through 20, will be collectively referred to as 'the video decoding method'.

Also, a video encoding apparatus including the multilayer video encoding apparatus 10, the video encoding apparatus 100, or the image encoder 1100, which is described with reference to FIGS. 1A through 20, will be collectively referred as a 'video encoding apparatus'. Also, a video decoding apparatus including the multilayer video decoding apparatus 20, the video decoding apparatus 900, or the image decoder 1200, which is described with reference to FIGS. 1A through 20, will be referred to as a 'video decoding apparatus'.

A computer-readable recording medium storing a program, e.g., a disc 26000, according to various embodiments will now be described in detail.

Figure 21:
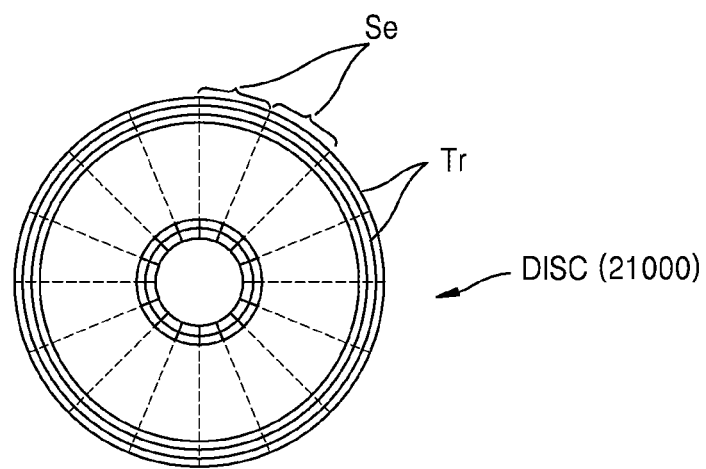
FIG. 21 is a diagram of a physical structure of a disc in which a program is stored, according to various embodiments.

FIG. 21 is a diagram of a physical structure of the disc 26000 in which a program is stored, according to various embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
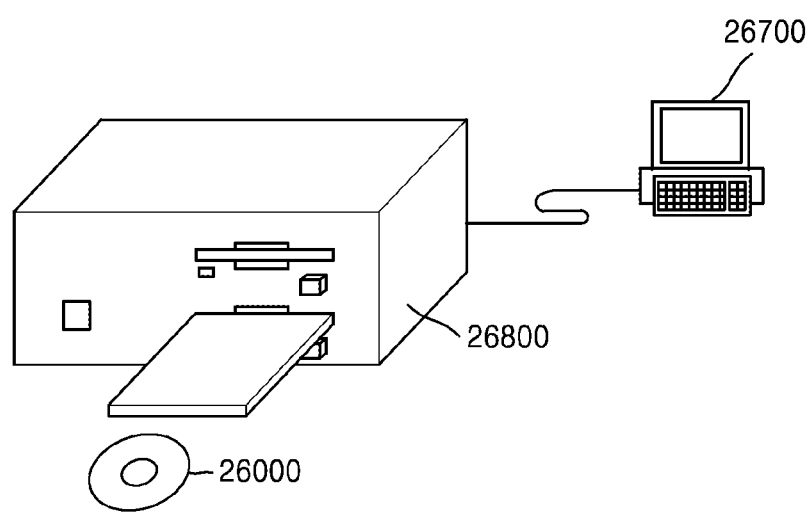
FIG. 22 is a diagram of a disc drive for recording and reading a program by using the disc.

FIG. 22 is a diagram of a disc drive 26800 for recording and reading a program by using the disc 26000. A computer system 26700 may store a program that executes at least one of a video encoding method and a video decoding method according to various embodiments, in the disc 26000 via the disc drive 26800. To run the program stored in the disc 26000 in the computer system 26700, the program may be read from the disc 26000 and be transmitted to the computer system 26700 by using the disc drive 26800.

The program that executes at least one of a video encoding method and a video decoding method according to various embodiments may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

Figure 23:
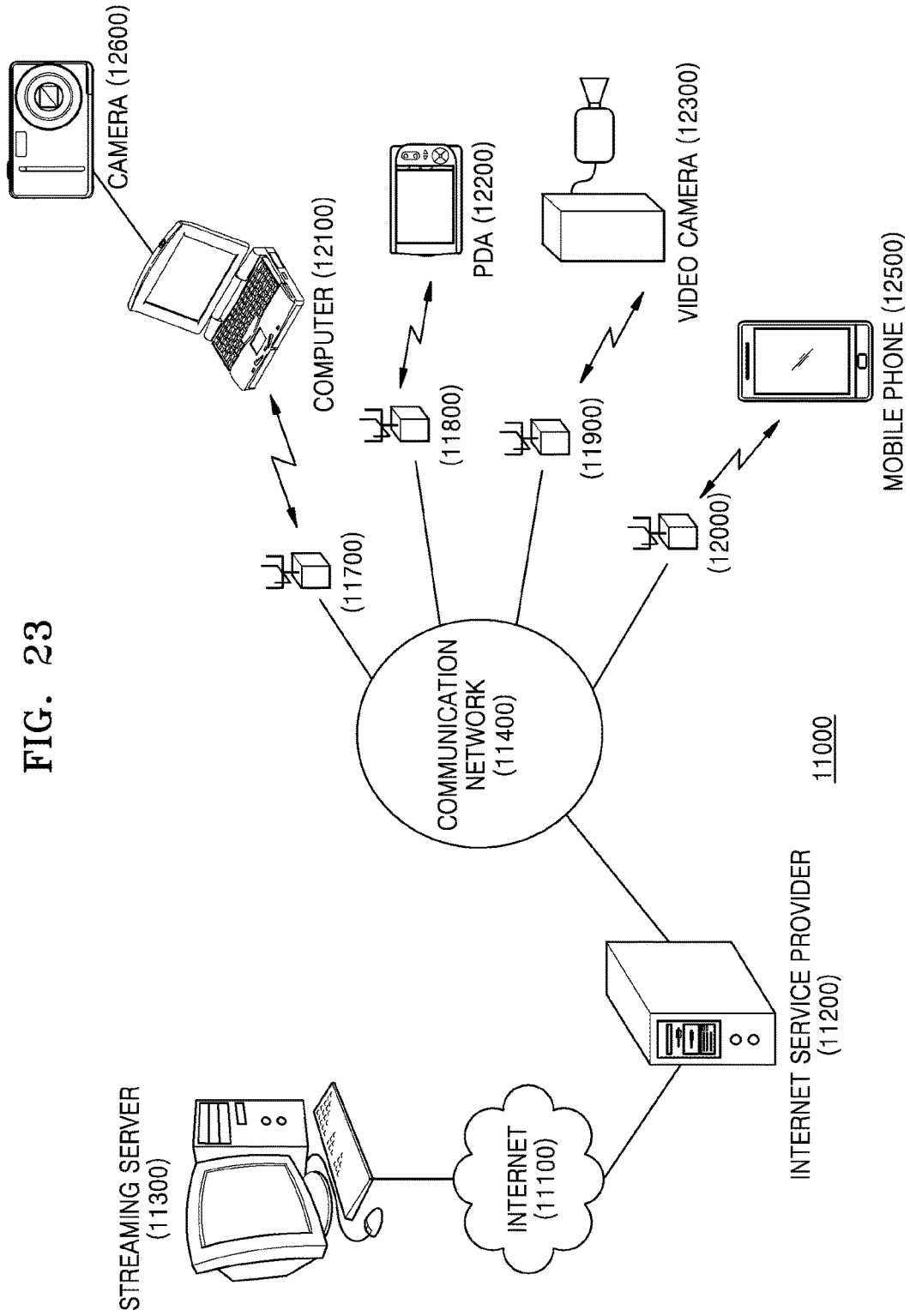
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
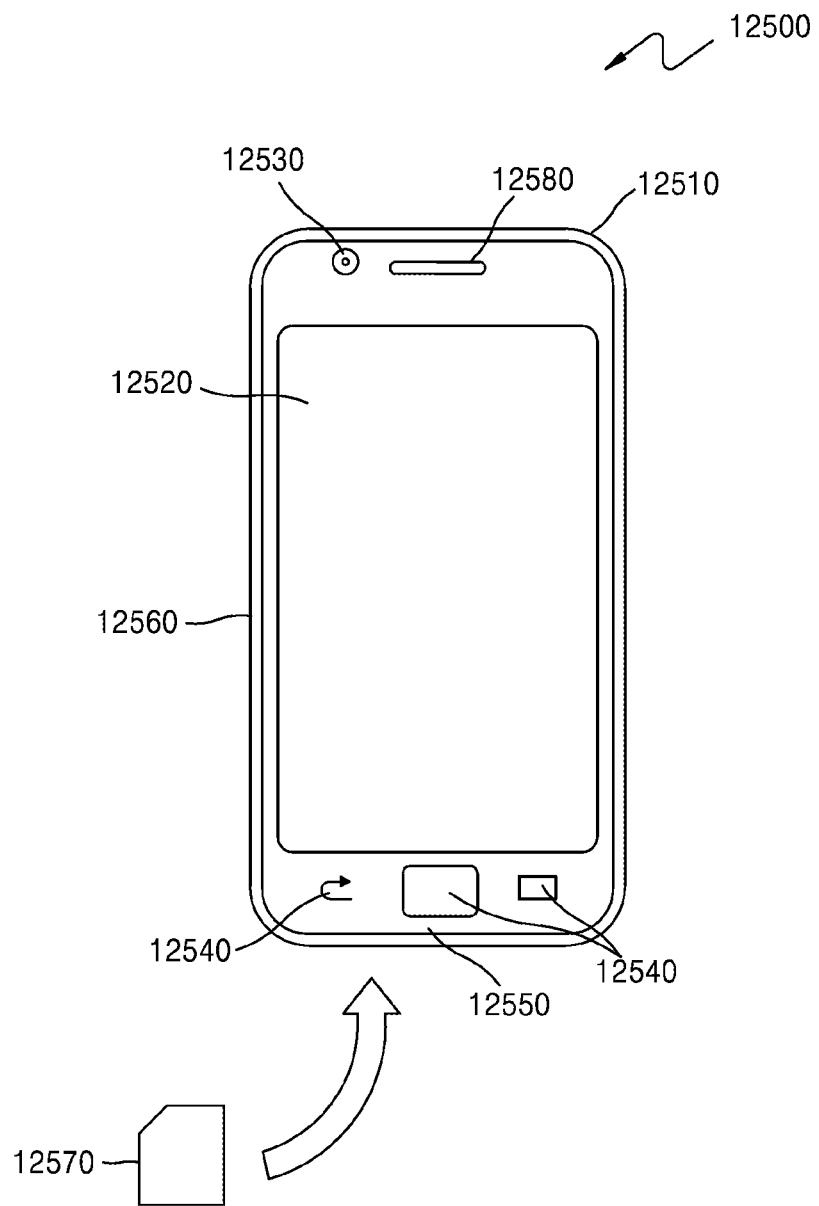
FIGS. 24 and 25 illustrate external and internal structures of a mobile phone to which a video encoding method and a video decoding method are applied, according to various embodiments.

However, the content supply system 11000 is not limited to as illustrated in FIG. 24 (OK?), and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to various embodiments.

Figure 25:
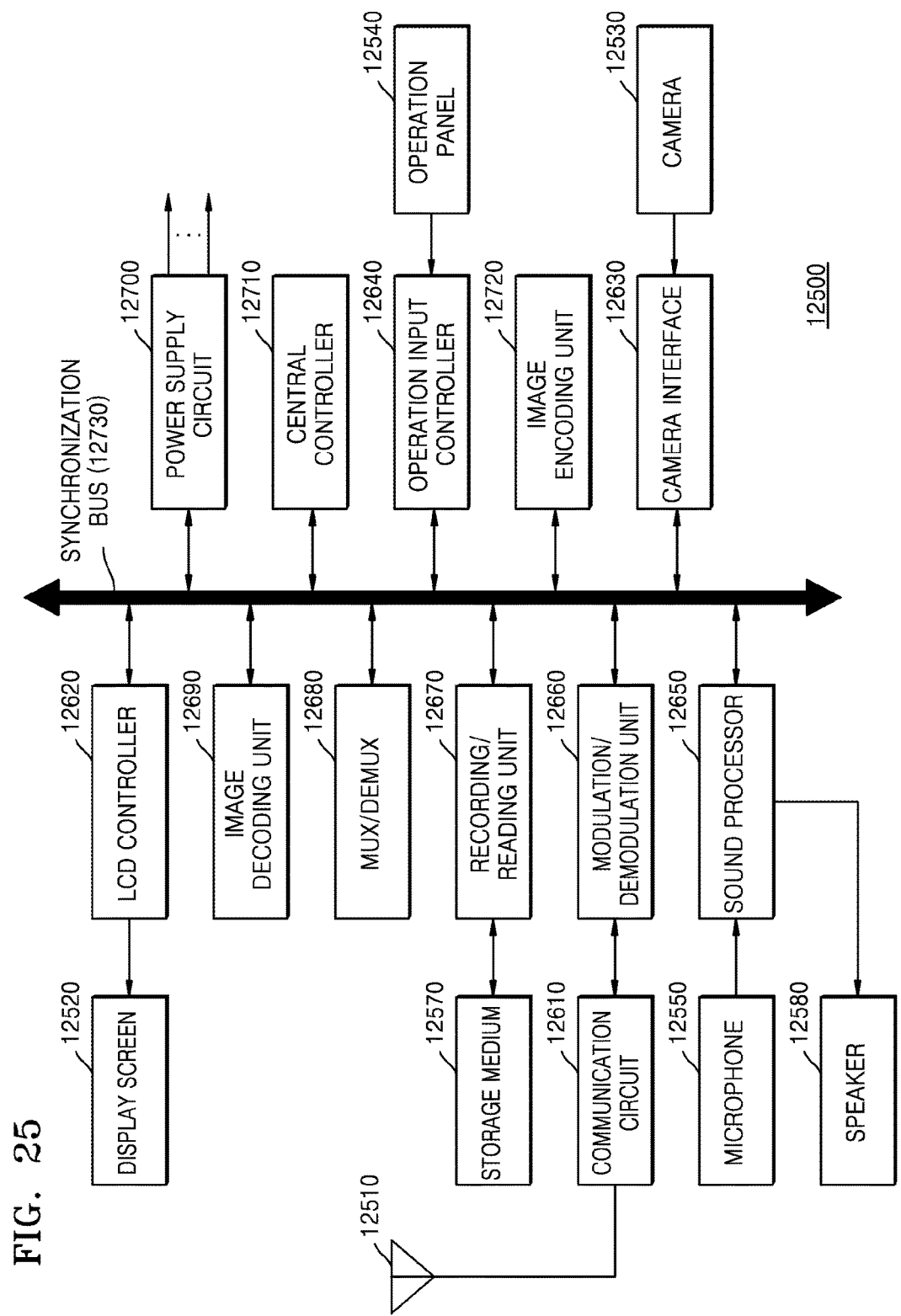

With reference to FIGS. 24 and 25, the mobile phone 12500 included in the content supply system 11000 according to various embodiments will now be described in detail.

FIG. 24 illustrates an external structure of the mobile phone 12500 to which a video encoding method and a video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, a video encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the video encoder 12720 may correspond to that of the video encoding apparatus 100 described above. The video encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the video encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to various embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to various embodiments, may be a transmitting terminal including only the video encoding apparatus, or may be a receiving terminal including only the video decoding apparatus.

Figure 26:
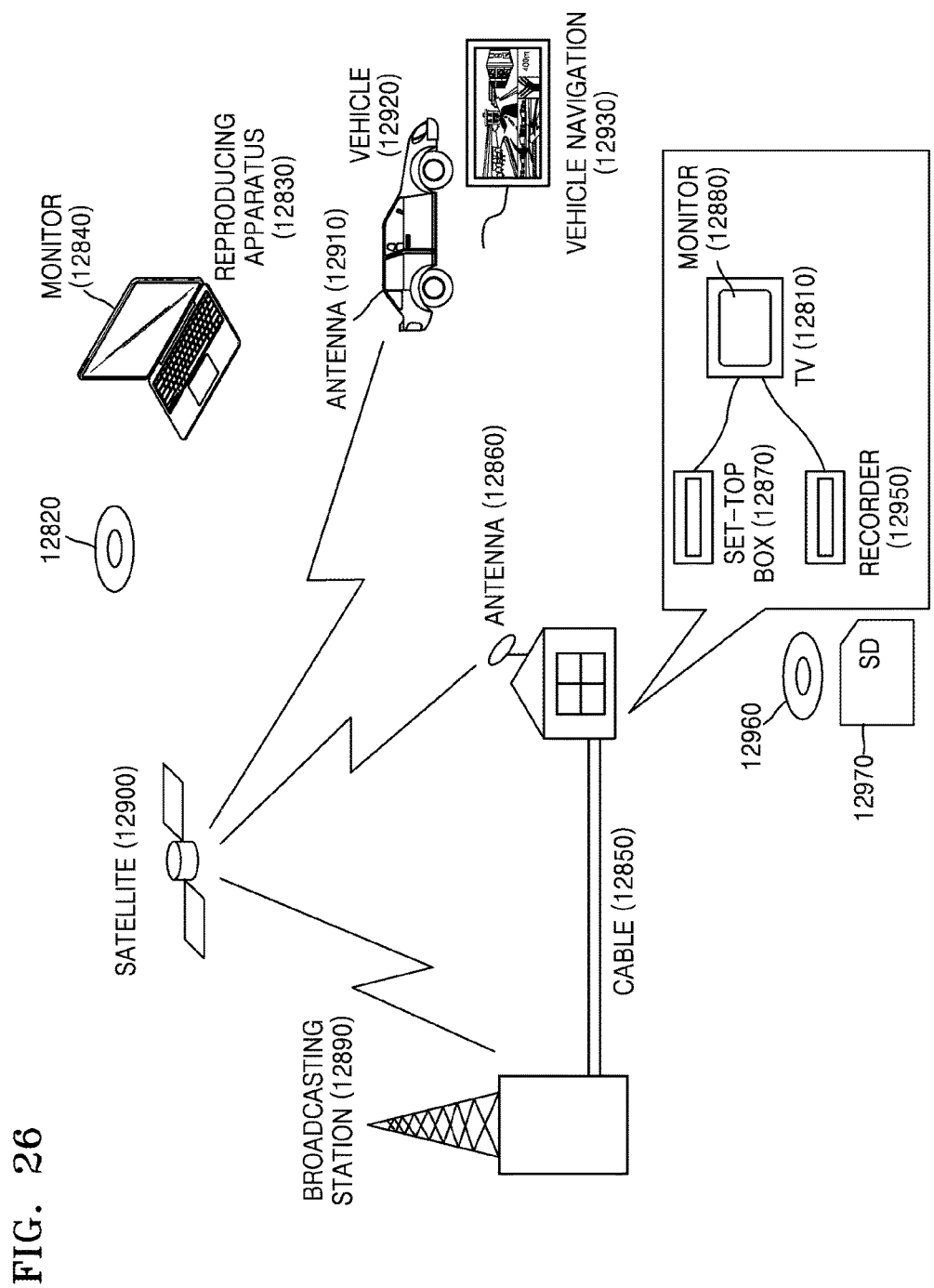
FIG. 26 illustrates a digital broadcasting system employing a communication system, according to various embodiments.

A communication system according to various embodiments is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus according to various embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to various embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to various embodiments may be installed. Data output from the set-top box 12870 may also be reproduced on a TV monitor 12880.

As another example, the video decoding apparatus according to various embodiments may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to various embodiments and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to various embodiments, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

FIG. 27 is a diagram illustrating a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. In another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to various embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to various embodiments described above with reference to FIGS. 21 through 27.

While this disclosure has been particularly shown and described with reference to various embodiments thereof, it will be understood by those of ordinary skill in the art that various changes in form and details may be made therein without departing from the spirit and scope of the following claims. Various embodiments should be considered in a descriptive sense only and not for purposes of limitation. Therefore, the scope of the disclosure is defined not by the detailed description of the disclosure but by the appended claims, and all differences within the scope will be construed as being included in the disclosure.

The invention claimed is:

1. A multilayer video decoding method comprising:
obtaining, from a bitstream, information indicating a maximum size of a decoded picture buffer (DPB) with respect to a layer set comprising a plurality of layers;
determining whether it is possible to obtain, from the bitstream, information indicating a maximum size of a sub DPB with respect to a layer format group included in the layer set;
when it is determined that it is possible to obtain the information indicating the maximum size of the sub DPB:
further obtaining, from the bitstream, information indicating a maximum size of a sub DPB with respect to a layer format group included in the layer set;
determining a size of a sub DPB with respect to the layer format group included in the layer set based on the obtained information indicating the maximum size of the sub DPB; and
storing a decoded picture of the layer format group in the sub DPB of the determined size, and
when it is determined that it is impossible to obtain the information indicating the maximum size of the sub DPB:
determining a size of the DPB with respect to the layer set based on the obtained information indicating the maximum size of the DPB; and
storing a decoded picture for the layer set in the DPB of the determined size, and
wherein the DPB comprises at least one sub DPB determined for each predetermined format group based on the information indicating the maximum size of the sub DPB, and
wherein the layer format group included in the layer set comprises at least one layer having a same image format.

2. The multilayer video decoding method of claim 1, wherein the obtaining of the information indicating the maximum size of the DPB with respect to the layer set comprises: when the layer set comprises a plurality of temporal sub layers, obtaining information indicating the maximum size of the DPB for each of the plurality of temporal sub layers included in the layer set.

3. The multilayer video decoding method of claim 2, wherein information indicating the maximum size of the DPB with respect to a temporal sub layer of a first index among the plurality of temporal sub layers included in the layer set indicates the maximum size of the DPB that is the same as or greater than the maximum size of the DPB with respect to a temporal sub layer of a second index indicating a temporal sub layer of a level lower than the first index.

4. The multilayer video decoding method of claim 1, wherein the obtaining of the information indicating the maximum size of the sub DPB comprises: when the layer set comprises a plurality of temporal sub layers, obtaining information indicating the maximum size of the sub DPB with respect to the layer format group for each of the plurality of temporal sub layers included in the layer set.

5. The multilayer video decoding method of claim 1, wherein the obtaining of the information indicating the maximum size of the DPB comprises: from the bitstream comprising high efficiency video coding (HEVC) network abstract layer (NAL) units, obtaining the information indicating the maximum size of the DPB from a video parameter set (VPS) extension region included in a raw bytes sequence payload (RBSP) of each of the HEVC NAL units.

6. A multilayer video decoding apparatus comprising at least one processor, the at least one processor that is configured to:
obtain, from a bitstream, information indicating a maximum size of a decoded picture buffer (DPB) with respect to a layer set comprising a plurality of layers;
determine whether it is possible to obtain, from the bitstream, information indicating a maximum size of a sub DPB with respect to a layer format group included in the layer set;
when it is determined that it is possible to obtain the information indicating the maximum size of the sub DPB:
further obtain, from the bitstream, information indicating a maximum size of a sub DPB with respect to a layer format group included in the layer set;
determine a size of a sub DPB with respect to the layer format group included in the layer set based on the obtained information indicating the maximum size of the sub DPB; and
store a decoded picture of the layer format group in the sub DPB of the determined size, and
when it is determined that it is impossible to obtain the information indicating the maximum size of the sub DPB:
determine a size of the DPB with respect to the layer set based on the obtained information indicating the maximum size of the DPB; and
store a decoded picture for the layer set in the DPB of the determined size, and
wherein the DPB comprises at least one sub DPB determined for each predetermined format group based on the information indicating the maximum size of the sub DPB, and
wherein the layer format group included in the layer set comprises at least one layer having a same image format.

7. The multilayer video decoding apparatus of claim 6, wherein, when the layer set comprises a plurality of temporal sub layers, the processor is configured to obtain information indicating the maximum size of the DPB for each of the plurality of temporal sub layers included in the layer set.

8. The multilayer video decoding apparatus of claim 7, wherein information indicating the maximum size of the DPB with respect to a temporal sub layer of a first index among the plurality of temporal sub layers included in the layer set indicates the maximum size of the DPB that is the same as or greater than the maximum size of the DPB with respect to a temporal sub layer of a second index indicating a temporal sub layer of a lower level than the first index.

9. The multilayer video decoding apparatus of claim 6, wherein, when the layer set comprises a plurality of temporal sub layers, the processor is configured to obtain information indicating the maximum size of the sub DPB with respect to the layer format group for each of the plurality of temporal sub layers included in the layer set.

10. The multilayer video decoding apparatus of claim 6, wherein the processor is configured to, from the bitstream comprising high efficiency video coding (HEVC) network abstract layer (NAL), units, obtain the information indicating the maximum size of the DPB from a video parameter set (VPS) extension region included in a raw bytes sequence payload (RBSP) of each of the HEVC NAL units.

* * * * *